United States Patent
Yamamoto

(10) Patent No.: US 11,924,286 B2
(45) Date of Patent: Mar. 5, 2024

(54) ENCRYPTED COMMUNICATION PROCESSING APPARATUS, ENCRYPTED COMMUNICATION PROCESSING SYSTEM, AND NON-TRANSITORY RECORDING MEDIUM

(71) Applicant: Satoru Yamamoto, Kanagawa (JP)

(72) Inventor: Satoru Yamamoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/930,160

(22) Filed: Sep. 7, 2022

(65) Prior Publication Data
US 2023/0109921 A1 Apr. 13, 2023

(30) Foreign Application Priority Data
Oct. 12, 2021 (JP) .................. 2021-167492

(51) Int. Cl.
*H04L 67/141* (2022.01)
*H04L 9/08* (2006.01)
*H04L 9/40* (2022.01)

(52) U.S. Cl.
CPC .......... *H04L 67/141* (2013.01); *H04L 9/0891* (2013.01); *H04L 63/0428* (2013.01)

(58) Field of Classification Search
CPC ... H04L 67/141; H04L 9/0891; H04L 9/0825; H04L 9/0841; H04L 9/14; H04L 9/40;
(Continued)

(56) References Cited

U.S. PATENT DOCUMENTS

2011/0296186 A1* 12/2011 Wong .................. H04L 63/0428
713/171
2018/0103092 A1 4/2018 Watanabe et al.
(Continued)

FOREIGN PATENT DOCUMENTS

CN 102577314 A * 7/2012 ........... H04L 63/168
JP 2014-014187 1/2014
(Continued)

OTHER PUBLICATIONS

English translation for JP-2020017857-A, published Jan. 2020.*
(Continued)

*Primary Examiner* — Alina A Boutah
(74) *Attorney, Agent, or Firm* — IPUSA, PLLC

(57) ABSTRACT

An information processing apparatus includes circuitry that detects reception of first data from a connection source apparatus. The first data includes information about establishment of a session for encrypted communication between the source apparatus using a service and a connection destination apparatus providing the service. The circuitry converts the first data into a first message following a communication protocol in the session establishment, and converts a second message from the destination apparatus into second data including at least information for generating a common key for the encrypted communication. Before the session establishment, the circuitry transmits the first message to the destination apparatus and transmits the second data to the source apparatus. After the session establishment, the circuitry transmits service data from the source apparatus to the destination apparatus and from the destination apparatus to the source apparatus in an unconverted state. The service data is used in the service.

12 Claims, 13 Drawing Sheets

(58) Field of Classification Search
CPC .. H04L 63/0428; H04L 63/0435; H04L 63/06
See application file for complete search history.

(56) References Cited

U.S. PATENT DOCUMENTS

2021/0281608 A1* 9/2021 Green ................... H04L 9/3263
2022/0103359 A1* 3/2022 Zheng .................... G06F 9/545

FOREIGN PATENT DOCUMENTS

| | | | |
|---|---|---|---|
| JP | 2016039456 A | * | 3/2016 |
| JP | 2018-061201 | | 4/2018 |
| JP | 2019-062495 | | 4/2019 |
| JP | 2019149715 A | * | 9/2019 |
| JP | 2020017857 A | * | 1/2020 |
| JP | 2020-195141 | | 12/2020 |

OTHER PUBLICATIONS

English translation for JP-2019149715-A, published Sep. 2019.*
English translation for CN-102577314-A, published Jul. 2012.*
English translation for JP-2016039456-A, published Mar. 2016.*

* cited by examiner

FIG. 5

| USER ID 51 | USER NAME 52 | PASSWORD (HASHED VALUE) 53 |
|---|---|---|
| u001 | SUZUKI | 427E170F76F81F7742E9DA100 |
| u002 | SATO | 109548320E1216758D686029CD |
| u003 | TANAKA | 6BC20F8892242A407D8F80B2F |
| ... | ... | ... |

| 55 CONNECTION DESTINATION ID | 56 CONNECTION DESTINATION NAME | 57 CONNECTION DESTINATION IP ADDRESS | 58 SESSION STATUS | 59 SESSION ID | 60 USER ID | 61 DATE AND TIME OF LAST USE |
|---|---|---|---|---|---|---|
| Dest01 | SATO'S PC | 192.168.1.1 | UNCONNECTED | - | - | 2020/1/1 10:00 |
| Dest02 | SUZUKI'S PC | 192.168.1.2 | CONNECTED | 000001 | u001 | 2020/1/2 12:34 |
| Dest03 | GROUP'S SHARED PC | 192.168.1.3 | CONNECTED | 000002 | u002 | 2020/1/4 13:30 |
| ... | ... | ... | ... | ... | ... | ... |

54

ENCRYPTED COMMUNICATION PROCESSING APPARATUS, ENCRYPTED COMMUNICATION PROCESSING SYSTEM, AND NON-TRANSITORY RECORDING MEDIUM

CROSS-REFERENCE TO RELATED APPLICATION

This patent application is based on and claims priority pursuant to 35 U.S.C. § 119(a) to Japanese Patent Application No. 2021-167492, filed on Oct. 12, 2021, in the Japan Patent Office, the entire disclosure of which is hereby incorporated by reference herein.

BACKGROUND

Technical Field

Embodiments of this disclosure relate to an information processing apparatus, an information processing system, and a non-transitory recording medium.

Related Art

In recent years, a technique has been widely used which enables the connection from home via the Internet to an apparatus or service deployed in an intranet inside a company or in a cloud network, for example. For instance, there is a technique of operating an electronic apparatus deployed in a remote location by using a terminal apparatus remotely connected to the electronic apparatus via the Internet.

SUMMARY

In one embodiment of this invention, there is provided an information processing apparatus that includes, for example, circuitry that detects reception of first data from a connection source apparatus. The first data includes information related to establishment of a session for executing encrypted communication between the connection source apparatus using a service and a connection destination apparatus providing the service. The circuitry further converts the first data into a first message conforming to a communication protocol used in the establishment of the session, and converts a second message received from the connection destination apparatus as a reply to the first message into second data including at least information for generating a common key used in the encrypted communication. Before the establishment of the session, the circuitry transmits the first message to the connection destination apparatus, and transmits the second data to the connection source apparatus. After the establishment of the session, the circuitry transmits first service data from the connection source apparatus to the connection destination apparatus in an unconverted state, and transmits second service data from the connection destination apparatus to the connection source apparatus in an unconverted state. The first service data and the second service data are used in the service.

In one embodiment of this invention, there is provided an information processing system that includes, for example, a connection source apparatus that uses a service, a connection destination apparatus that provides the service, and an information processing apparatus. The information processing apparatus includes first circuitry that detects reception of first data from the connection source apparatus. The first data includes information related to establishment of a session for executing encrypted communication between the connection source apparatus and the connection destination apparatus. The first circuitry further converts the first data into a first message conforming to a communication protocol used in the establishment of the session, and converts a second message received from the connection destination apparatus as a reply to the first message into second data including at least information for generating a common key used in the encrypted communication. Before the establishment of the session, the first circuitry transmits the first message to the connection destination apparatus, and transmits the second data to the connection source apparatus. After the establishment of the session, the first circuitry transmits first service data from the connection source apparatus to the connection destination apparatus in an unconverted state, and transmits second service data from the connection destination apparatus to the connection source apparatus in an unconverted state. The first service data and the second service data are used in the service. The connection source apparatus including second circuitry that transmits the first data to the information processing apparatus and receives the second data from the information processing apparatus. The second circuitry further generates the common key with the second data. After the establishment of the session, the second circuitry uses the common key to encrypt the first service data used in the service and decrypt the second service data used in the service. The connection destination apparatus includes third circuitry that receives the first message from the information processing apparatus and transmits the second message to the information processing apparatus. The third circuitry further generates the common key with the first message. After the establishment of the session, the third circuitry uses the common key to encrypt the second service data used in the service and decrypt the first service data used in the service.

In one embodiment of this invention, there is provided a non-transitory recording medium which, when executed by one or more processors, cause the processors to perform a method including, for example, detecting reception of first data from a connection source apparatus. The first data includes information related to establishment of a session for executing encrypted communication between the connection source apparatus using a service and a connection destination apparatus providing the service. The method further includes converting the first data into a first message conforming to a communication protocol used in the establishment of the session, and converting a second message received from the connection destination apparatus as a reply to the first message into second data including at least information for generating a common key used in the encrypted communication. The method further includes, before the establishment of the session, transmitting the first message to the connection destination apparatus and transmitting the second data to the connection source apparatus, and after the establishment of the session, transmitting first service data from the connection source apparatus to the connection destination apparatus in an unconverted state and transmitting second service data from the connection destination apparatus to the connection source apparatus in an unconverted state. The first service data and the second service data are used in the service.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 5 is a diagram illustrating an example of authentication information used in a remote desktop service of the first embodiment;

FIG. 6 is a diagram illustrating an example of management information used in the remote desktop service of the first embodiment;

Figure 1:
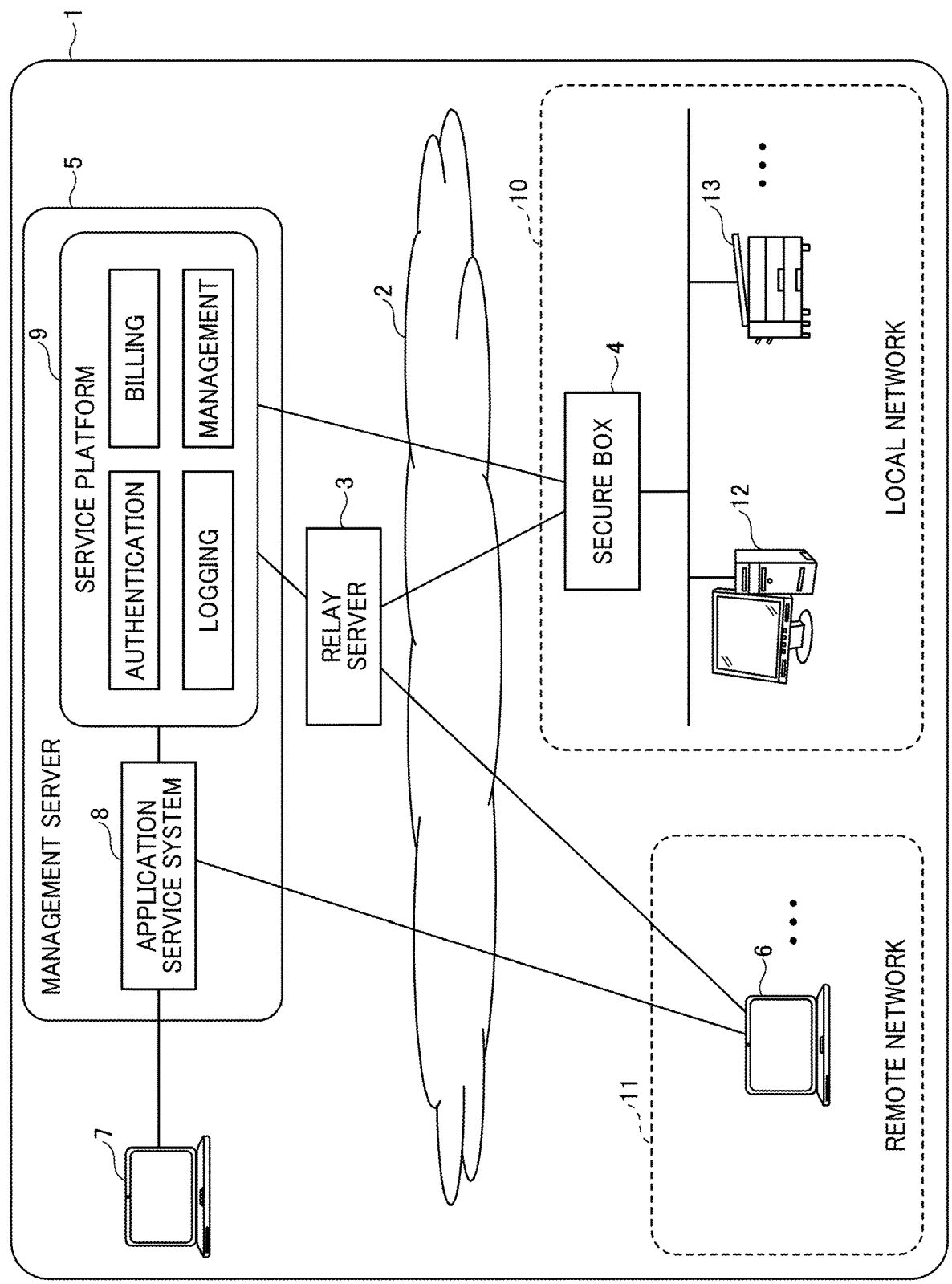
FIG. 1 is a schematic diagram illustrating an example of an information processing system according to a first embodiment of the present invention.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of an information processing apparatus, an information processing system, and a non-transitory recording medium of the present disclosure are described in detail below. As used herein, the singular forms "a," "an," and "the" are intended to include the plural forms as well, unless the context clearly indicates otherwise.

A first embodiment of the present invention will be described.

An overview of an information processing system of the first embodiment will first be described.

FIG. 1 is a schematic diagram illustrating an example of the information processing system of the first embodiment. An information processing system 1 includes an application service system 8, a service platform 9, and a relay server 3 that connect to a communication network 2 such as the Internet and a secure box 4 that connects to a local network 10, for example. The information processing system 1 is a system for using an electronic apparatus connected to the local network 10, such as a server apparatus 12 or an image forming apparatus 13, from a terminal apparatus 6 connected to an external network such as a remote network 11. Hereinafter, the electronic apparatus will also be referred to as the connection destination or the connection destination apparatus, and the terminal apparatus 6 will also be referred to as the connection source or the connection source apparatus. Further, the secure box 4 is an information processing apparatus that communicates with the connection source apparatus using a service and the connection destination apparatus providing the service.

The local network 10 is a network such as an in-house local area network (LAN), for example. The access to the local network 10 by the communication network 2 and the external network such as the remote network 11 is restricted by a firewall, for example.

The remote network 11 is an external network different from the local network 10. The remote network 11 is provided in a remote office, for example.

It is assumed here that the service platform 9 and the secure box 4 have previously been set to be communicable with each other. It is also assumed that apparatuses such as the terminal apparatus 6 and the relay server 3 are prohibited from or incapable of accessing apparatuses in the local network 10, such as the secure box 4, the server apparatus 12, and the image forming apparatus 13. In the present example, a remote desktop service and a facsimile (FAX) service will be described as examples of the service provided by the connection destination. The service provided by the connection destination, however, is not limited thereto. The connection destination may be any device server having data that is transmitted to or received from the terminal apparatus 6 as the connection source through protocol conversion by the secure box 4 of the present embodiment. It is assumed hereinafter that the server apparatus 12 providing the remote desktop service is used as the connection destination, unless otherwise specified.

The application service system 8 provides a requested service to the terminal apparatus 6 as the connection source via an authentication-enabled world wide web (Web) user interface (UI). The application service system 8 further provides the information of the relay server 3 to the terminal apparatus 6 in accordance with the requested service. Major roles of the application service system 8 include: the provision of the Web UI (e.g., the means of use according to the service and various management functions), the management of information (e.g., information such as the user, the service, the connection destination, the secure box 4, and the policy), the issuance of instructions to the secure box 4 (e.g., an instruction to change settings and an instruction to connect to the relay server 3), and the issuance of instructions to the user using the service (e.g., an instruction via message notification and an instruction for controlling the use of the service).

The secure box 4 connects to the relay server 3 in accordance with the instruction from the application service system 8, and relays and/or protocol-converts an operation performed on the connection destination by the terminal apparatus 6 as the connection source or a response from the connection destination to the terminal apparatus 6 as the connection source. That is, the terminal apparatus 6 as the connection source remotely connects to the connection destination apparatus such as the server apparatus 12 or the image forming apparatus 13 via the secure box 4. The secure box 4 further executes the instructions from the application service system 8 (e.g., the setting of the secure box 4, the registration of a device as the connection destination, and the use of a remote connection service).

The relay server 3 mediates the connection between the terminal apparatus 6 as the connection source and the secure box 4. Major roles of the relay server 3 include: the management of sessions (e.g., a session between the terminal apparatus 6 and the relay server 3 and a session between the secure box 4 and the relay server 3) and the relay of data transmitted and received between the terminal apparatus 6 and the secure box 4. Herein, the session refers to the connection making two apparatuses communicable with each other, and the establishment of the session refers to securing the connection for the communication between two apparatuses.

The service platform 9 provides platform functions such as the authentication of users and devices, the bidirectional communication with the secure box 4, a log function such as logging communication, the management of contracts with clients, a billing function, and a data lake function.

The terminal apparatus 6 is an information processing apparatus equipped with a Web communication function such as a Web browser, such as a personal computer (PC), a tablet terminal, or a smartphone, for example. The terminal apparatus 6 is used by the user of the service. The terminal apparatus 6 accesses the application service system 8 and the relay server 3, for example, via the remote network 11 and the communication network 2.

A terminal apparatus 7 is an apparatus equipped with a Web communication function such as a Web browser. The terminal apparatus 7 is used by an administrator who administrates the information processing system 1, for example.

The server apparatus 12 is an information processing apparatus, such as a PC, connected to the local network 10. The server apparatus 12 provides a service such as the remote desktop service. The image forming apparatus 13 is an electronic apparatus with an image forming function, such as a multifunction peripheral (MFP), for example, connected to the local network 10. The image forming apparatus 13 provides a service such as the FAX service.

The server apparatus 12 and the image forming apparatus 13 are examples of an information processing apparatus or electronic apparatus connected to the local network 10 to provide a particular service. Other examples of such an information processing apparatus or electronic apparatus may include output apparatuses such as a projector (PJ), an interactive whiteboard (IWB), which is an electronic whiteboard that performs intercommunication, and digital signage. Further, the information processing apparatus or electronic apparatus may be an industrial machine, an imaging device, a sound collector, medical equipment, a networked home electric appliance, a smartphone, a tablet terminal, a gaming system, a personal digital assistant (PDA), or a digital camera, for example. Furthermore, the information processing apparatus or electronic apparatus may be a virtual information processing apparatus or virtual electronic equipment, such as a virtual server.

To use the service provided by the server apparatus 12 or the image forming apparatus 13, the terminal apparatus 6 executes a session establishment process and encrypted communication with an application installed in the terminal apparatus 6. The application may run on an operating system (OS) operating on the terminal apparatus 6, or may be installed in the terminal apparatus 6 as an extended function of the Web browser, for example. If the application is of the Web browser, the application may be managed by the connection source that provides screen information of the Web browser. Thereby, installing and updating of the application by the user are facilitated. Further, the setting values in the session establishment and the encrypted communication (e.g., the setting values in an encryption scheme) and the keys used in the encryption are storable in the application of the Web browser.

Each of the application service system 8, the service platform 9, the relay server 3, and the secure box 4 is an information processing apparatus configured as a computer or a system including a plurality of such information processing apparatuses, for example. The application service system 8 and the service platform 9 may be included in a single management server 5. Various system configurations are applicable to the application service system 8 and the service platform 9. In the following description, the application service system 8 and the service platform 9 will be simply referred to as the management server 5, without being distinguished from each other.

The system configuration of the information processing system 1 illustrated in FIG. 1 is illustrative. For example, therefore, the terminal apparatus 6 is not necessarily connected to the remote network 11, and may be connected to the communication network 2 or various networks connectable to the communication network 2. Further, the relay server 3 may be included in the management server 5. Furthermore, the information processing system 1 may include a plurality of relay servers 3 or a plurality of secure boxes 4. Moreover, the communication network 2 may include a connection section of mobile communication or wireless communication with a wireless LAN, for example.

An example of the hardware configuration of an information processing apparatus of the present embodiment will be described.

Figure 2:
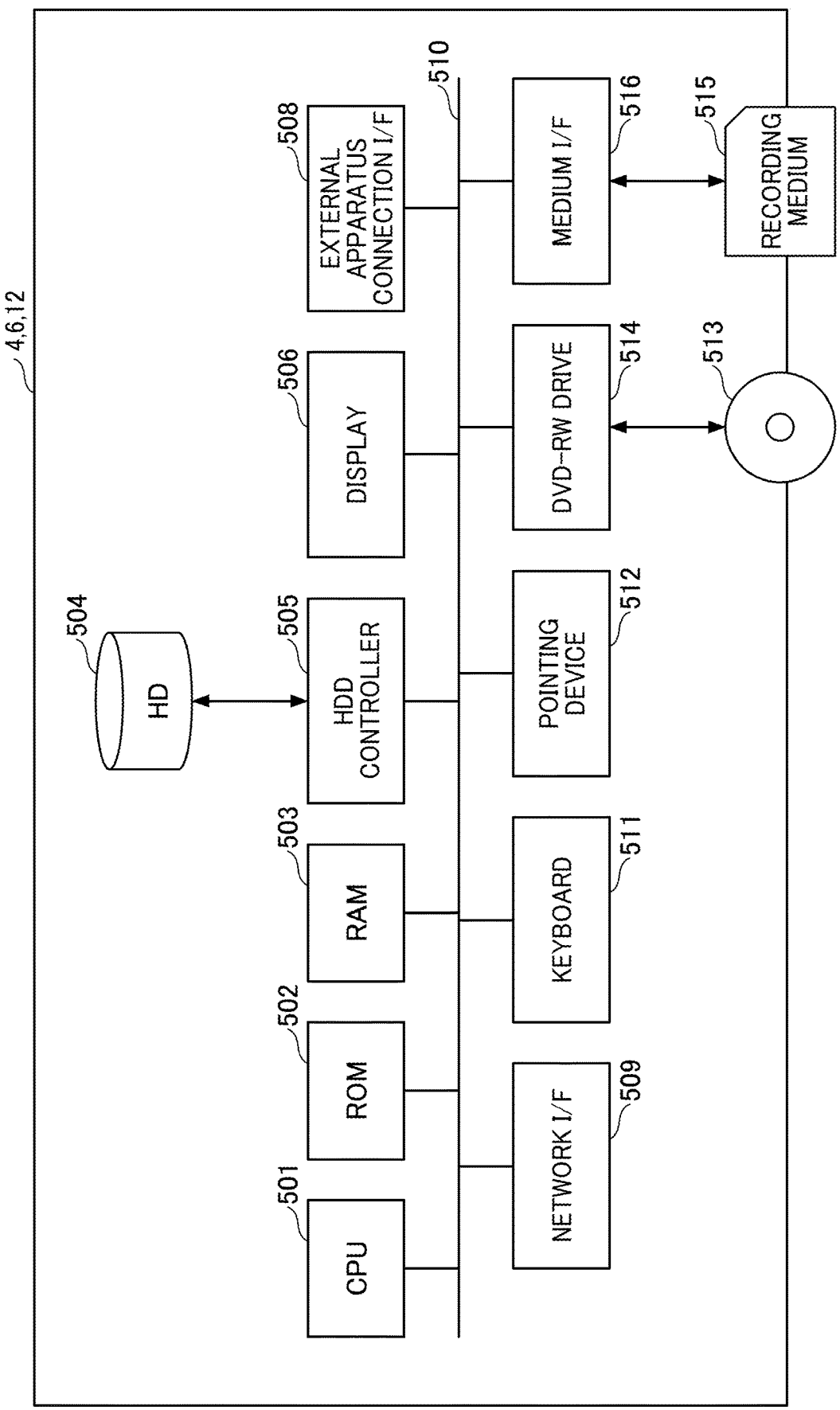
FIG. 2 is a diagram illustrating an example of the hardware configuration of an information processing apparatus included in the information processing system of the first embodiment.

FIG. 2 is a diagram illustrating an example of the hardware configuration of an information processing apparatus forming each of the secure box 4, the terminal apparatus 6, and the server apparatus 12 of the present embodiment. As illustrated in FIG. 2, the information processing apparatus is implemented by a computer including a central processing unit (CPU) 501, a read only memory (ROM) 502, a random access memory (RAM) 503, a hard disk (HD) 504, a hard disk drive (HDD) controller 505, a display 506, an external apparatus connection interface (I/F) 508, a network I/F 509, a bus line 510, a keyboard 511, a pointing device 512, a digital versatile disc-rewritable (DVD-RW) drive 514, and a medium I/F 516.

The CPU 501 controls overall operation of the information processing apparatus. The ROM 502 stores a program used to drive the CPU 501, such as an initial program loader (IPL). The RAM 503 is used as a work area for the CPU 501. The HD 504 stores various data of programs, for example. The HDD controller 505 controls writing and reading of various data to and from the HD 504 under the control of the CPU 501. The display 506 displays various information such as a cursor, menus, windows, text, and images. The external apparatus connection I/F 508 is an interface for connecting the information processing apparatus to various external apparatuses. The external apparatuses in this case include a universal serial bus (USB) memory and a printer, for example. The network I/F 509 is an interface for performing data communication via the communication network 2. The bus line 510 includes an address bus and a data bus for electrically connecting the CPU 501 and the other components in FIG. 2 to each other.

The keyboard 511 is an input device including a plurality of keys used to input text, numerical values, and various instructions, for example. The pointing device 512 is an input device used to select and execute various instructions, select a processing target, and move the cursor, for example. The DVD-RW drive 514 controls writing and reading of various data to and from a DVD-RW 513 as an example of a removable recording medium. The control of data writing and reading by the DVD-RW drive 514 is not limited to the DVD-RW and is also applicable to a DVD-recordable (DVD-R), for example. The medium I/F 516 controls writing (i.e., storage) and reading of data to and from a recording medium 515 such as a flash memory.

Functions of the information processing system 1 will be described.

Figure 3:
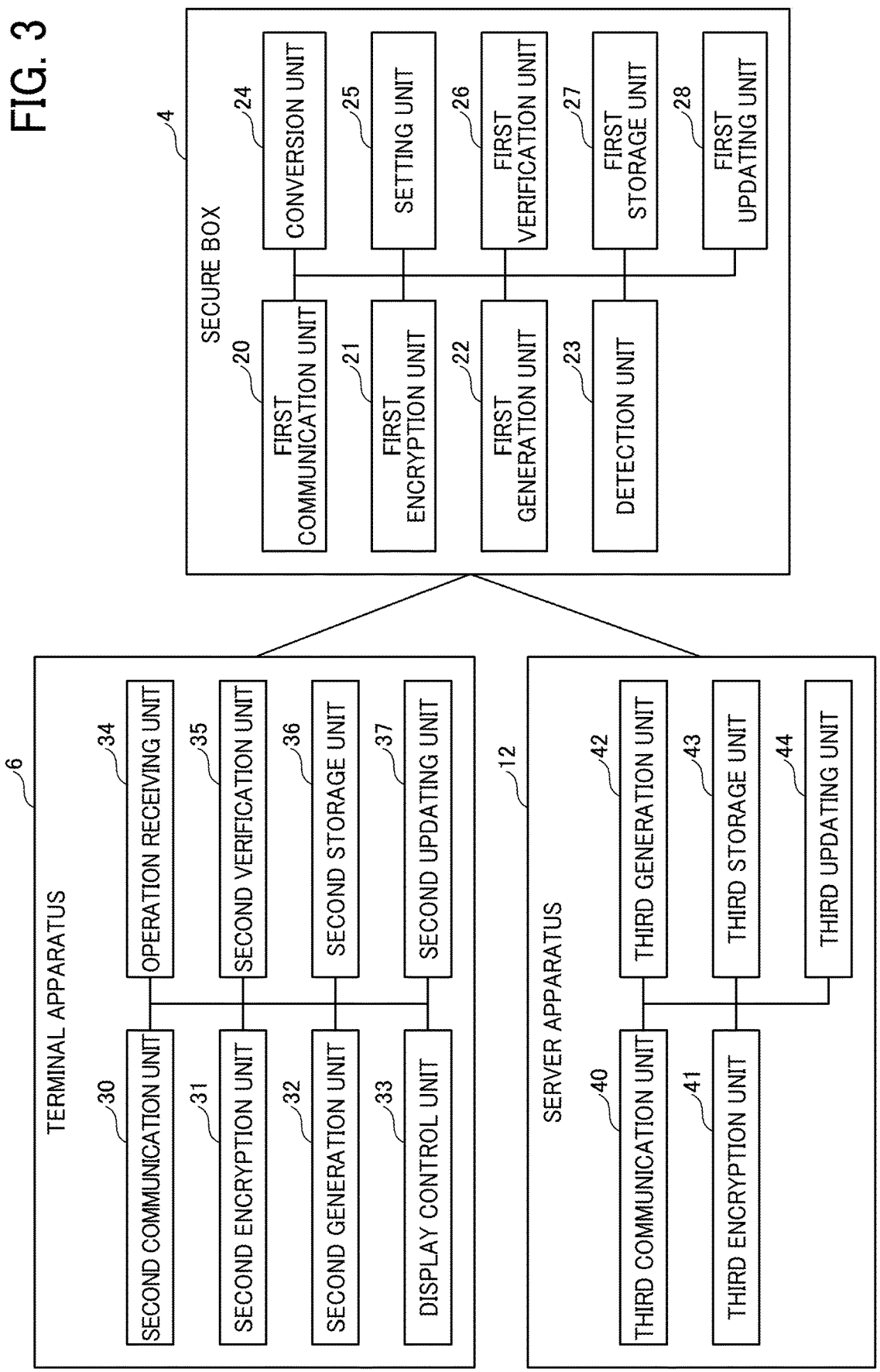
FIG. 3 is a diagram illustrating a configuration example of functional blocks of the information processing system of the first embodiment.

FIG. 3 is a diagram illustrating a configuration example of functional blocks of the information processing system 1 of the present embodiment. The secure box 4 includes a first communication unit 20, a first encryption unit 21, a first generation unit 22, a detection unit 23, a conversion unit 24, a setting unit 25, a first verification unit 26, and a first updating unit 28. Each of these units is a function or means implemented by the CPU 501 executing a command included in at least one program installed in the information processing apparatus forming the secure box 4. The secure box 4 further includes a first storage unit 27, which may be implemented by a storage device of the secure box 4, such as the HD 504, for example.

The first communication unit 20 is a communication function of the secure box 4. The first communication unit 20 transmits and receives information to and from the relay server 3 via the communication network 2. The first communication unit 20 further transmits and receives information to and from an apparatus included in the local network 10, such as the server apparatus 12 or the image forming apparatus 13.

The first encryption unit 21 performs an encryption process on transmission data to be transmitted by the first communication unit 20 of the secure box 4, or performs a decryption process to decrypt encrypted data received by the first communication unit 20 of the secure box 4.

The first generation unit 22 generates a common key with information obtained through a process such as transport layer security (TLS) handshake. The first generation unit 22 further generates a random number value for generating or exchanging the key.

The detection unit 23 detects whether the session for the data received by the first communication unit 20 of the secure box 4 has been established between the connection source that requests the service and the connection destination that provides the service. Methods for the detection include a method of checking information of session status included in management information and a method of checking detection information stored in data transmitted by an apparatus, i.e., the information stored in the data by the apparatus to identify the type of data.

The conversion unit 24 converts data including information of the TLS handshake received from the terminal apparatus 6 into a message of the TLS handshake to be transmitted to the server apparatus 12. The conversion unit 24 further converts a message of the TLS handshake received from the server apparatus 12 into data including information of the TLS handshake to be transmitted to the terminal apparatus 6.

After the session between the terminal apparatus 6 and the server apparatus 12 is established, the setting unit 25 sets the information of the session status to "connected." Further, after the session between the terminal apparatus 6 and the server apparatus 12 is ended, the setting unit 25 sets the information of the session status to "unconnected."

The first verification unit 26 verifies a certificate received by the first communication unit 20 of the secure box 4 to confirm the validity of an apparatus that has issued the certificate. The method of the verification may be a commonly used verification method. For example, the first verification unit 26 verifies whether the value obtained by decrypting a digital signature in the certificate with a public key matches hashed data.

The first storage unit 27 stores the information of the TLS handshake and a random number or encryption key (e.g., common key) generated or received from another apparatus, as well as information such as the generation date and time, the reception date and time, the storage date and time, and the expiration date of the encryption key.

The first updating unit 28 updates the encryption key based on the generation date and time, the reception date and time, the storage date and time, and the expiration date of the encryption key, the current date and time, a particular elapsed time from the establishment of the session, and a security policy, for example. The first updating unit 28 further requests another apparatus holding the same encryption key to update the encryption key. Both parties of communication should generate the same encryption key value. The method of updating the encryption key therefore uses the output value obtained by inputting the current encryption key value in a particular hash function, for example. Alternatively, a method specified in the TLS protocol or a method equivalent thereto may be used to update the encryption key.

The terminal apparatus 6 includes a second communication unit 30, a second encryption unit 31, a second generation unit 32, a display control unit 33, an operation receiving unit 34, a second verification unit 35, and a second updating unit 37. Each of these 5 units is a function or means implemented by the CPU 501 executing a command included in at least one program installed in the information processing apparatus forming the terminal apparatus 6. The terminal apparatus 6 further includes a second storage unit 36, which may be implemented by a storage device of the terminal apparatus 6, such as the HD 504, for example.

The second communication unit 30 is a communication function of the terminal apparatus 6. The second communication unit 30 transmits and receives information to and from the application service system 8 or the relay server 3 via the communication network 2.

The second encryption unit 31 performs an encryption process on transmission data to be transmitted by the second communication unit 30 of the terminal apparatus, or performs a decryption process to decrypt encrypted data received by the second communication unit 30 of the terminal apparatus 6.

The second generation unit 32 generates a common key with information obtained through a process such as TLS handshake. The second generation unit 32 further generates a random number value for generating or exchanging the key.

The display control unit 33 displays, with received screen information, a screen such as a log-in screen on the screen of the terminal apparatus 6.

The operation receiving unit 34 receives, via the keyboard 511 or the pointing device 512 of the terminal apparatus 6, an operation performed by the user, such as the input of text or the pressing of a button.

The second verification unit 35 verifies a certificate received by the second communication unit 30 of the terminal apparatus 6 to confirm the validity of an apparatus that has issued the certificate. The method of the verification may be a commonly used verification method. For example, the second verification unit 35 verifies whether the value obtained by decrypting a digital signature in the certificate with a public key matches hashed data.

The second storage unit 36 stores the information of the TLS handshake and a random number or encryption key (e.g., common key) generated or received from another apparatus, as well as information such as the generation date and time, the reception date and time, the storage date and time, and the expiration date of the encryption key. The second updating unit 37 updates the encryption key based on the generation date and time, the reception date and time, the storage date and time, and the expiration date of the encryption key, the current date and time, and a security policy, for example. The second updating unit 37 further requests another apparatus holding the same encryption key to update the encryption key. Both parties of communication should generate the same encryption key 5 value. The method of updating the encryption key therefore uses the output value obtained by inputting the current encryption key value in a particular hash function, for example. Alternatively, a method specified in the TLS protocol or a method equivalent thereto may be used to update the encryption key.

The server apparatus 12 includes a third communication unit 40, a third encryption unit 41, a third generation unit 42, and a third updating unit 44. Each of these units is a function or means implemented by the CPU 501 executing a command included in at least one program installed in the information processing apparatus forming the server apparatus 12. The server apparatus 12 further includes a third storage unit 43, which may be implemented by a storage device of the server apparatus 12, such as the HD 504, for example.

The third communication unit 40 transmits and receives information to and from the secure box 4 deployed in the local network 10.

The third encryption unit 41 performs an encryption process on transmission data to be transmitted by the third communication unit 40 of the server apparatus 12, or performs a decryption process to decrypt encrypted data received by the third communication unit 40 of the server apparatus 12.

The third generation unit 42 generates a common key with information obtained through a process such as TLS handshake. The third generation unit 42 further generates a random number value for generating or exchanging the key.

The third storage unit 43 stores the information of the TLS handshake and a random number or encryption key (e.g., common key) generated or received from another apparatus, as well as information such as the generation date and time, the reception date and time, the storage date and time, and the expiration date of the encryption key.

The third updating unit 44 updates the encryption key based on the generation date and time, the reception date and time, the storage date and time, and the expiration date of the encryption key, the current date and time, and the security policy, for example. The third updating unit 44 further requests another apparatus holding the same encryption key to update the encryption key. Both parties of communication should generate the same encryption key value. The method of updating the encryption key therefore uses the output value obtained by inputting the current encryption key value in a particular hash function, for example. Alternatively, a method specified in the TLS protocol or a method equivalent thereto may be used to update the encryption key.

A remote desktop service starting process of the present embodiment will be described.

Figure 4:
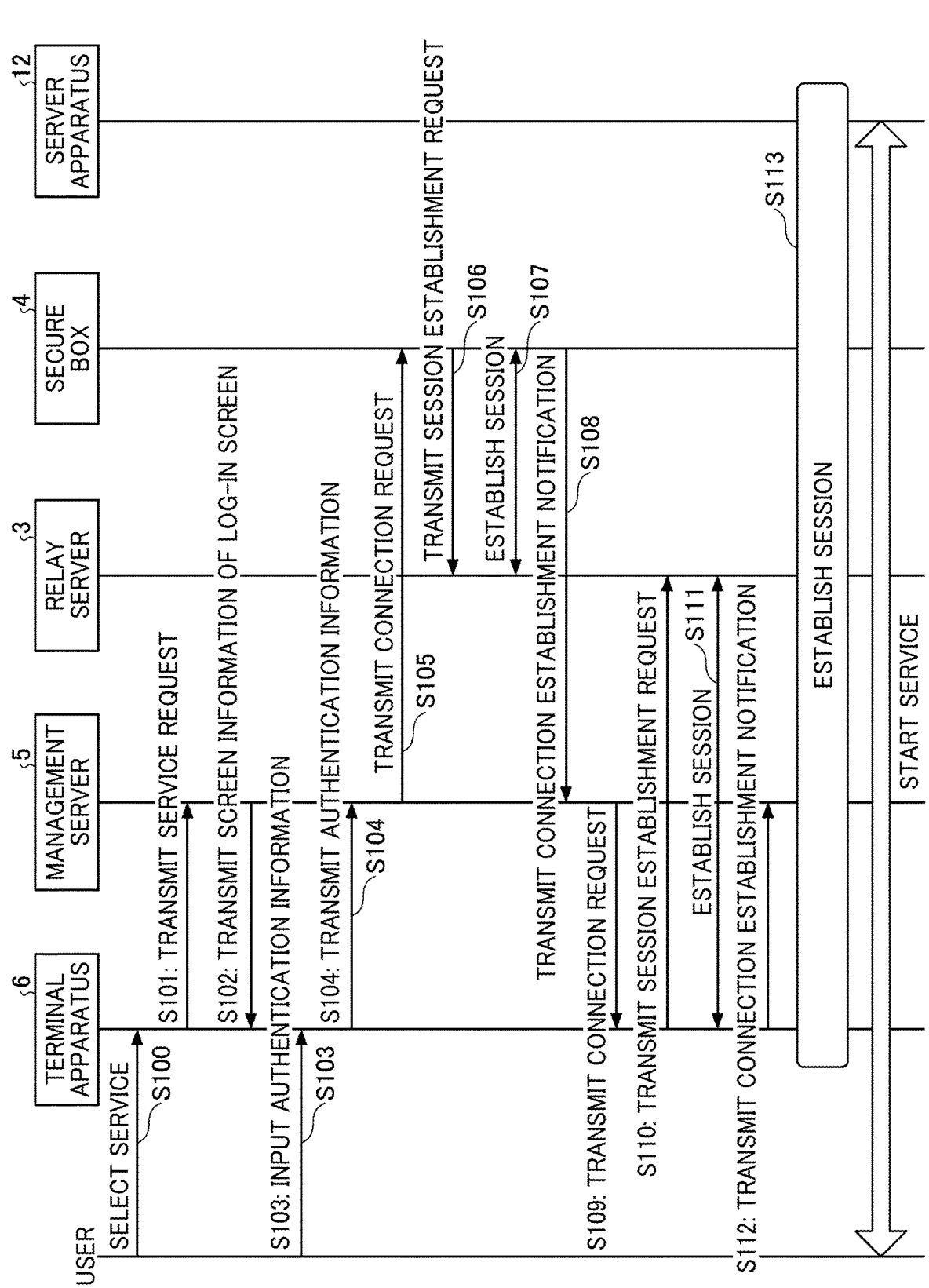
FIG. 4 is a diagram illustrating a sequence example of a remote desktop service starting process of the first embodiment.

FIG. 4 is a diagram illustrating a sequence example of the remote desktop service starting process of the present embodiment. In the present sequence, to use the remote desktop service, the user first operates the terminal apparatus 6 to select the service and log in to the information processing system 1. If the log-in process succeeds, the session for encrypted communication is established between the secure box 4 and the relay server 3 and between the terminal apparatus 6 and the relay server 3. Then, the session for encrypted communication is established between the terminal apparatus 6 and the server apparatus 12 that provides the remote desktop service, thereby allowing the terminal apparatus 6 to use the remote desktop service. The process of establishing the session between the terminal apparatus 6 and the server apparatus 12 will be described in detail later with FIG. 10.

The processes of respective steps of the remote desktop service starting process in FIG. 4 will be described below.

At step S100, the operation receiving unit 34 of the terminal apparatus 6 receives an operation of selecting the remote desktop service performed by the user.

At step S101, the second communication unit 30 of the terminal apparatus 6 transmits a service request message to the management server 5 to request the start of the remote desktop service. The service request message includes information for identifying the connection destination apparatus.

At step S102, the management server 5 transmits the screen information of the log-in screen to the second communication unit 30 of the terminal apparatus 6. The display control unit 33 of the terminal apparatus 6 displays the log-in screen on the screen of the terminal apparatus 6. It is assumed here that the connection destination apparatus identified by the service request message is not being used by another user, for example, i.e., the connection destination apparatus is available for use.

At step S103, the operation receiving unit 34 of the terminal apparatus 6 receives an operation of inputting authentication information (e.g., a user name and a password) on the log-in screen performed by the user.

At step S104, the second communication unit 30 of the terminal apparatus 6 transmits the authentication information input by the user to the management server 5. With the received authentication information, the management server 5 executes the authentication of the user.

FIG. 5 is a diagram illustrating an example of the authentication information used in the remote desktop service of the present embodiment. Authentication information 50 illustrated in FIG. 5 includes a user identification (ID) 51, a user name 52, and a password 53.

The user ID 51 is information used to identify the user. The user ID 51 is formed with characters, symbols, and numbers, for example. The ID is also referred to as the identifier, and will hereinafter be used with the same meaning as described above. The user name 52 is the name of the user identified by the user ID. The password 53 is used with the user ID 51 in the user authentication. From a security standpoint, the set value of the password is normally held not as the original value but as a hashed value, i.e., as the output value obtained by inputting the value of the password in a hash function. In the user authentication, the hashed value of the received password is calculated, and whether the calculated value matches the held value is determined.

Referring back to FIG. 4, it is assumed here that the user authentication has succeeded. At step S105, the management server 5 transmits a connection request message to the first communication unit 20 of the secure box 4. The connection request message includes information for identifying the addresses of the relay server 3 and the server apparatus 12, to which the secure box 4 is to connect (e.g., identifiers and internet protocol (IP) addresses).

At step S106, with the information of the IP address of the relay server 3 included in the received connection request message, the first communication unit 20 of the secure box 4 transmits a session establishment request message to the relay server 3.

FIG. 6 is a diagram illustrating an example of management information used in the remote desktop service of the present embodiment. Management information 54 illustrated in FIG. 6 includes a connection destination ID 55, a connection destination name 56, a connection destination IP address 57, a session status 58, a session ID 59, a user ID 60, and a last use date and time 61. The management information 54 is held in the management server or the secure box 4, and is used to determine whether the service is available for use or to determine the data transfer destination, for example.

The connection destination ID 55 is information used to identify the server apparatus 12 that provides the remote desktop service. The connection destination ID 55 is formed with characters, symbols, and numbers, for example.

The connection destination name 56 is the name of the connection destination that provides the remote desktop service.

The connection destination IP address 57 is the IP address of the server apparatus 12 that provides the remote desktop service.

The session status 58 is information indicating whether a session has been established between the terminal apparatus 6 operated by the user and the server apparatus 12 that provides the remote desktop service. For example, the session status 58 is displayed as "unconnected" when the session is not established, and is displayed as "connected" when the session is established.

The session ID 59 is used to identify the established session.

The user ID 60 is information for identifying the user who has requested the management server 5 to provide the service.

The last use date and time 61 is the date and time of last use of the service specified by the connection destination ID 55 (i.e., the date and time of last completion of the service).

Referring back to FIG. 4, the session is established between the secure box 4 and the relay server 3 at step S107. A method of establishing the session uses a communication protocol called TLS, for example.

Figure 7:
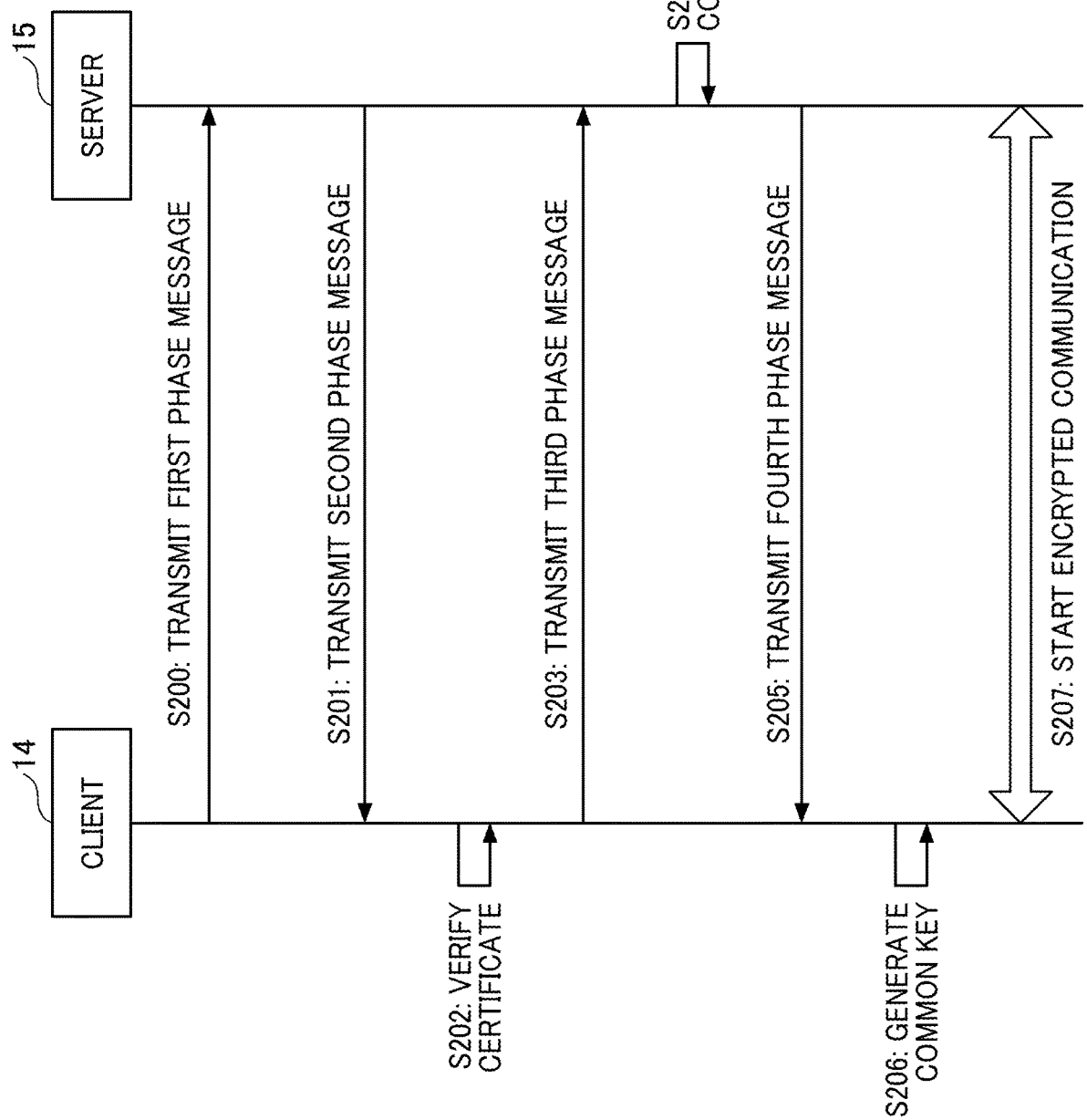
FIG. 7 is a diagram illustrating a sequence example of a transport layer security (TLS) handshake process of the first embodiment.

FIG. 7 is a diagram illustrating a sequence example of a TLS handshake process of the present embodiment. A handshake is a process executed to exchange necessary information between two apparatuses that communicate with each other. Hereinafter, an apparatus that transmits a connection request will be referred to as the client 14, and an apparatus that receives the connection request will be referred to as the server 15. At step S107 in FIG. 4, the secure box 4 corresponds to the client 14, and the relay server 3 corresponds to the server 15.

The processes of respective steps of the TLS handshake process in FIG. 7 will be described.

At step S200, the client 14 transmits a first phase message to the server 15. The first phase message includes ClientHello. ClientHello includes information such as the value of a random number generated by the client 14 to be used for later-described key exchange, the version of the communication protocol, and an encryption scheme used after the establishment of the session.

At step S201, the server 15 transmits a second phase message to the client 14 as a reply to the first phase message. The second phase message includes ServerHello, ServerCertificate, ServerKeyExchange, and ServerHelloDone. ServerHello includes information such as the value of a random number generated by the server 15 to be used for the key exchange, the version of the communication protocol, and the encryption scheme used after the establishment of the session. ServerKeyExchange includes information used for the key exchange. ServerCertificate includes a certificate of the server 15. ServerHelloDone indicates that the second phase message does not include any further information. That is, ServerHelloDone indicates the end of the message.

At step S202, the client 14 verifies the received certificate of the server 15 to confirm the validity of the server 15. The method of the verification may be a commonly used verification method.

At step S203, the client 14 transmits a third phase message to the server 15 as a reply to the second phase message. The third phase message includes ClientKeyExchange, ChangeCipherSpec, and Finished. ClientKeyExchange includes information used for the key exchange. ChangeCipherSpec indicates that the information transmitted thereafter will be encrypted. Finished indicates that the client 14 will not transmit any further information related to the handshake.

At step S204, the server 15 generates a common key for encrypting and decrypting data transmitted and received in the communication between the client 14 and the server 15. The method of generating the common key will be described later in connection with the key exchange.

At step S205, the server 15 transmits a fourth phase message to the client 14 as a reply to the third phase message. The fourth phase message includes ChangeCipherSpec and Finished. ChangeCipherSpec indicates that the information transmitted thereafter will be encrypted. Finished indicates that the server 15 will not transmit any further information related to the handshake.

At step S206, the client 14 generates the common key for encrypting and decrypting the data transmitted and received in the communication between the client 14 and the server 15. The method of generating the common key will be described later.

At step S207, encrypted communication starts between the client 14 and the server 15. That is, the client 14 and the server 15 transmit to each other the data encrypted with the common key and decrypt the received encrypted data with the common key.

Referring back to FIG. 4, at step S108, the first communication unit 20 of the secure box 4 transmits a connection establishment notification message to the management server 5 to notify that the connection to the relay server 3 has been established.

At step S109, the management server 5 transmits a connection request message to the second communication unit 30 of the terminal apparatus 6. The connection request message includes information for identifying the address of the relay server 3, to which the terminal apparatus 6 is to connect (e.g., the identifier and the IP address).

At step S110, with the information of the IP address of the relay server 3 included in the received connection request message, the second communication unit 30 of the terminal apparatus 6 transmits a session establishment request message to the relay server 3.

At step S111, a session is established between the terminal apparatus 6 and the relay server 3. The method of establishing the session uses TLS, for example, similarly to the method described above in step S107.

At step S112, the second communication unit 30 of the terminal apparatus 6 transmits a connection establishment notification message to the management server 5 to notify that the connection to the relay server 3 has been established.

At step S113, a process of establishing a session between the terminal apparatus 6 and the server apparatus 12 is executed. This process will be described later with another sequence diagram.

With the above-described process, the remote desktop service starts. Since the secure box 4 and the server apparatus 12 are both apparatuses located in the local network 10, the encryption of the communication therebetween is considered unnecessary. The communication between the secure box 4 and the server apparatus 12, however, may be encrypted as necessary with a session for TLS communication established therebetween.

A description will be given of a method of key exchange executed in the TLS handshake described above with FIG. 7.

Figure 8:
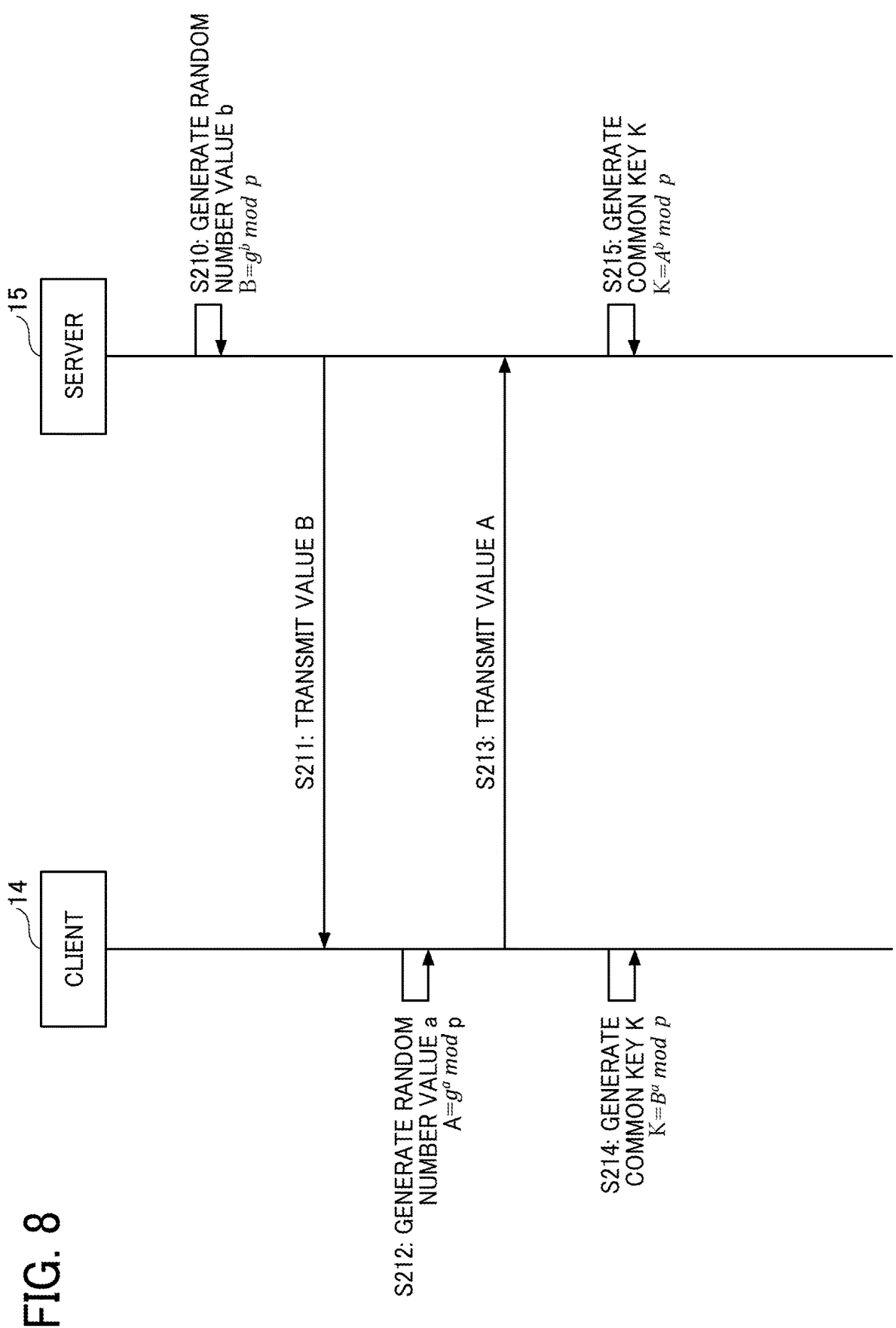
FIG. 8 is a diagram illustrating a sequence example of a Diffie-Hellman (DH) key exchange process of the first embodiment.

FIG. 8 is a diagram illustrating a sequence example of a Diffie-Hellman (DH) key exchange process of the present embodiment. There are a plurality of key exchange methods available in the TLS handshake process. The DH key exchange is one of the plurality of available key exchange methods. Key exchange is a process of sharing a common key between two apparatuses that perform encrypted communication therebetween, while preventing the leakage of information to a third party at a relay apparatus, for example.

The processes of respective steps of the DH key exchange process in FIG. 8 will be described below.

At step S210, the server 15 generates a random number, the value of which is represented as b. The server 15 calculates a value B expressed by equation (1) given below.

$$B = g^b \bmod p \quad (1)$$

Herein, X mod Y, for example, represents the remainder of a division X/Y. The same applies to the subsequent equations. The values of g and p are previously determined.

At step S211, the server 15 transmits the value B to the client 14. Herein, B corresponds to the value included in ServerKeyExchange of the second phase message transmitted at step S201 in FIG. 7.

At step S212, the client 14 generates a random number, the value of which is represented as a. The client 14 calculates a value A expressed by equation (2) given below.

$$A = g^a \bmod p \quad (2)$$

Herein, the values of g and p are the same as those used in step S210.

At step S213, the client 14 transmits the value A to the server 15. Herein, A corresponds to the value included in ClientKeyExchange of the third phase message transmitted at step S203 in FIG. 7.

At step S214, the client 14 generates a common key K by calculating equation (3) given below.

$$K = B^a \bmod p \quad (3)$$

At step S215, the server 15 generates the common key K by calculating equation (4) given below.

$$K = A^b \bmod p \quad (4)$$

With the above-described process, the value of the common key K is shared between the client 14 and the server 15. Even if a third party succeeds in intercepting the values A and B transmitted and received between the client 14 and the server 15, calculating the common key K from the values A and B is assumed impractical in consideration of a realistic amount of computation involved in the calculation. A method using Diffie-Hellman ephemeral (DHE) key exchange improved from the DH key exchange or a method using elliptic curve (EC) key exchange may also be used in the TLS handshake. Further, a method with digital signature for preventing identity theft (e.g., man-in-the-middle attack), such as Diffie-Hellman ephemeral Digital Signature Standard (DRE_DSS), may also be used in the TLS handshake. These methods are different from the above-described method in that different numerical formulae are used to calculate the values A and B and the common key K in the client 14 and the server 15, and in that different values of g and p are used at each connection in the DHE key exchange. These methods are, however, basically the same as the above-described method in the procedure illustrated in FIGS. 7 and 8. That is, these methods are the same as the above-described method in that each of two parties transmits a particular value to the other party and calculates a common value (i.e., common key) incalculable by a third party even if the third party succeeds in intercepting the particular value.

Another method of key exchange will be described.

Figure 9:
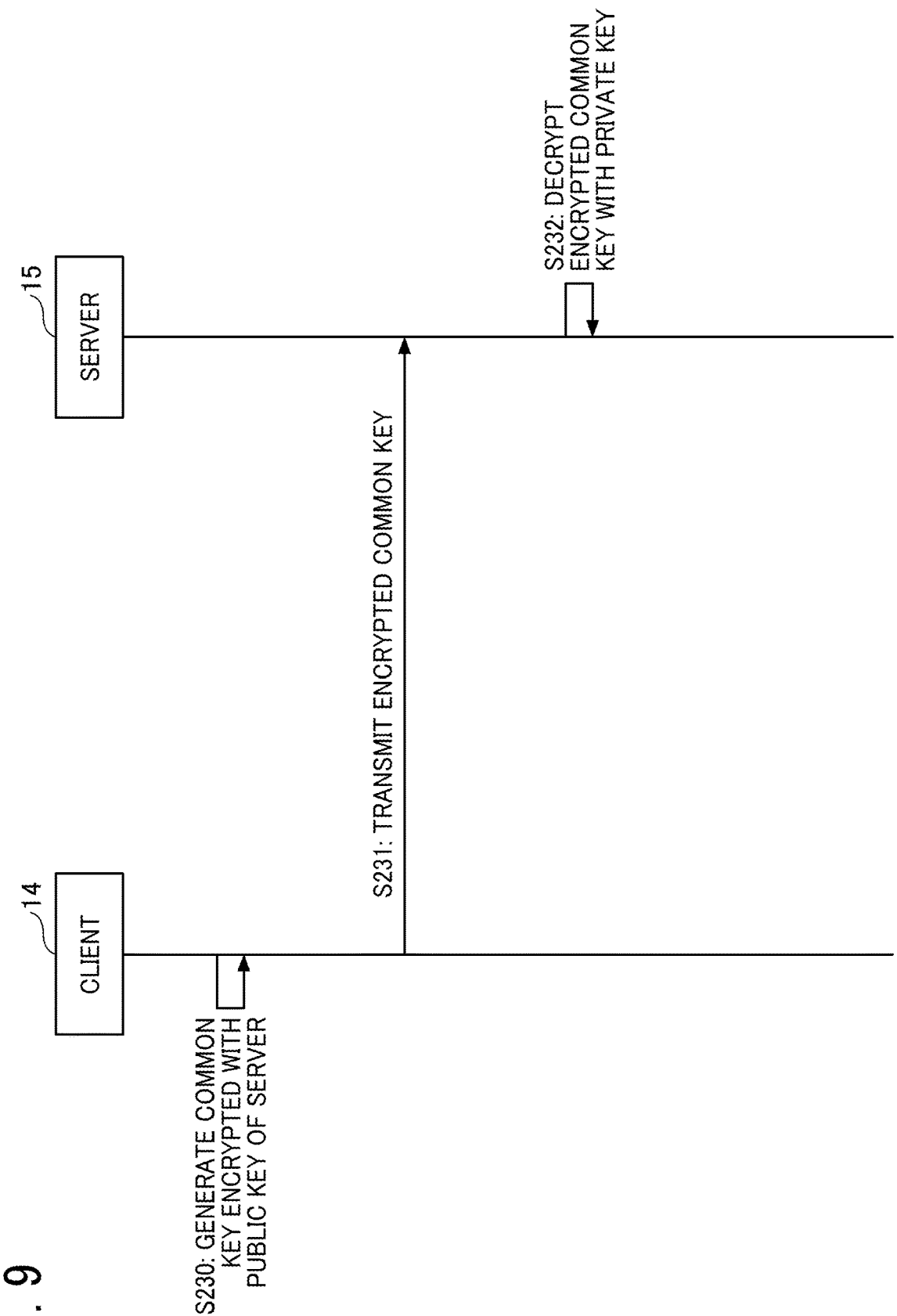
FIG. 9 is a diagram illustrating a sequence example of a Rivest-Shamir-Adelman (RSA) key exchange process of the first embodiment.

FIG. 9 is a diagram illustrating a sequence example of a Rivest-Shamir-Adelman (RSA) key exchange process of the present embodiment. Similarly to the DH key exchange illustrated in FIG. 8, the RSA key exchange is a key exchange method available in the TLS handshake process.

The processes of respective steps of the RSA key exchange process in FIG. 9 will be described.

At step S230, the client 14 generates the value of a common key to be used in encrypted communication between the client 14 and the server 15. The value of the random number generated by the client 14 may be used as the value of the common key. The client 14 encrypts the common key with a public key of the server 15.

At step S231, the client 14 transmits the encrypted common key to the server 15. The encrypted common key corresponds to the value included in ClientKeyExchange of the third phase message transmitted at step S203 in FIG. 7.

At step S232, the server 15 decrypts the received encrypted common key with a private key of the server 15, to thereby obtain the common key.

With the above-described process, the client 14 and the server 15 share the value of the common key K without the risk of information leakage to a third party.

The process of step S113 in FIG. 4 will be described in detail with FIG. 10.

Figure 10:
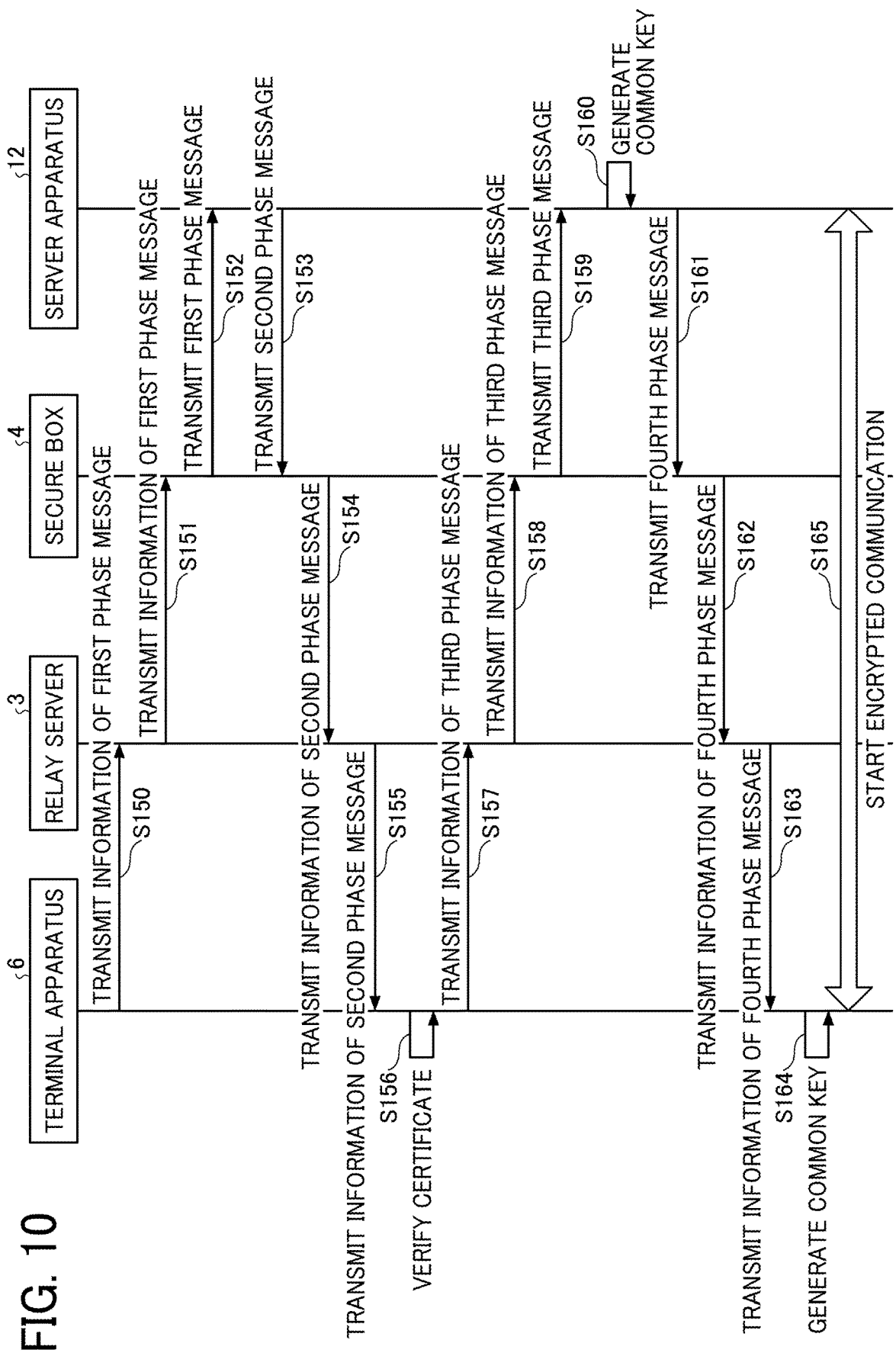
FIG. 10 is a diagram illustrating a sequence example of a session connection process of the first embodiment.

FIG. 10 is a diagram illustrating a sequence example of a session connection process of the first embodiment. In the present sequence, the session for executing the encrypted communication is established between the terminal apparatus 6 and the server apparatus 12. The secure box 4 located between the terminal apparatus 6 and the server apparatus 12 terminates the protocol of the encrypted communication. According to a typical technique, therefore, the session for the encrypted communication is not established between the terminal apparatus 6 and the server apparatus 12. According to the first embodiment, on the other hand, the TLS handshake is executed between the secure box 4 and the server apparatus 12 while the information for the TLS handshake is shared between the terminal apparatus 6 and the secure box 4. Consequently, the terminal apparatus 6 obtains the common key after the TLS handshake. The secure box 4 transfers the data received from the terminal apparatus 6 to the server apparatus 12 and transfers the data received from the server apparatus 12 to the terminal apparatus 6, thereby enabling the encrypted communication between the terminal apparatus 6 and the server apparatus 12.

The processes of respective steps of the session connection process in FIG. 10 will be described.

At step S150, the terminal apparatus 6 transmits information to be used in the first phase message of the TLS handshake to the relay server 3. The information to be used in the first phase message of the TLS handshake includes the value of the random number used for the key exchange, the version of the communication protocol, and the encryption scheme used after the establishment of the session, for example, which are included in the ClientHello, as described above in step S200 of FIG. 4. The information to be used in the first phase message of the TLS handshake is an example of first data.

The information transmitted from the terminal apparatus 6 at step S150 may be limited to the information that should be obtained from the terminal apparatus 6 for the TLS handshake executed between the secure box 4 and the server apparatus 12. For example, the version of the communication protocol is information set by the secure box 4, which executes the TLS handshake. It is therefore unnecessary to transmit the version of the communication protocol from the terminal apparatus 6. It is also unnecessary to transmit the encryption scheme from the terminal apparatus 6 if the encryption scheme to be used has previously been determined. On the other hand, detection information in a particular format is included in the information transmitted from the terminal apparatus 6 at step S150 to enable the secure box 4 to detect that the data received from the terminal apparatus 6 includes the information related to the first phase message of the TLS handshake. For example, as the detection information, a particular value according to the type of the data is stored in a head portion of the data, which is a data portion having a fixed size (e.g., 1 byte, 2 bytes, or 4 bytes). For instance, a value 0 is stored as the detection information if the data is unrelated to the TLS handshake, and a value 1, 2, 3, or 4 is stored as the detection information if the data is related to the first, second, third, or fourth phase message of the TLS handshake. The particular value according to the type of the data is an example of data type information. It is assumed here that the detection information is also included in the data transmitted from the secure box 4 to the terminal apparatus 6 as well as in the data transmitted from the terminal apparatus 6 to the secure box 4.

It is also assumed here that the session for the encrypted communication has been established between the terminal apparatus 6 and the relay server 3 through step S111 in FIG. 4. Herein, the common key used in this encryption is represented as the common key CA. With the common key CA, the second encryption unit 31 of the terminal apparatus 6 first encrypts the data including the information to be used in the first phase message by the secure box 4. The second communication unit 30 of the terminal apparatus 6 then transmits the encrypted data (i.e., the data including the information to be used in the first phase message) to the relay server 3.

At step S151, with the common key CA, the relay server 3 decrypts the encrypted data received from the second communication unit 30 of the terminal apparatus 6. It is assumed here that the session for the encrypted communication has also been established between the relay server 3 and the secure box 4 through step S107 of FIG. 4. Herein, the common key used in this encryption is represented as the common key CB. The relay server 3 encrypts the received data with the common key CB, and transmits the encrypted data (i.e., the data including the information to be used in the first phase message) to the secure box 4.

At step S152, the first communication unit 20 of the secure box 4 receives from the relay server 3 the data encrypted with the common key CB. Then, the first encryption unit 21 of the secure box 4 decrypts the received encrypted data with the common key CB. Further, the detection unit 23 of the secure box 4 detects that the received data includes the detection information indicating that the received data includes the information related to the first phase message of the TLS handshake. The conversion unit 24 of the secure box 4 converts the received data into the first phase message of the TLS handshake. The first communication unit 20 of the secure box 4 transmits the converted data (i.e., the first phase message of the TLS handshake) to the third communication unit 40 of the server apparatus 12. The first phase message of the TLS handshake is an example of a first message.

At step S153, the third communication unit 40 of the server apparatus 12 transmits the second phase message of the TLS handshake to the first communication unit 20 of the secure box 4 in response to reception of the first phase message of the TLS handshake. The second phase message of the TLS handshake is an example of a second message.

At step S154, the secure box 4 transmits the information related to the received second phase message of the TLS handshake to the terminal apparatus 6 via the relay server 3. Herein, the conversion unit 24 of the secure box 4 converts the second phase message into data to be transmitted to the terminal apparatus 6 such that the data includes the minimum necessary information in a particular format. The conversion unit 24 further includes the detection information described above in step S150 in the data to be transmitted. The first encryption unit 21 of the secure box 4 encrypts the data to be transmitted with the common key CB. The first communication unit 20 of the secure box 4 transmits the encrypted data (i.e., the data including the information related to the second phase message of the TLS handshake) to the relay server 3. The information related to the second phase message of the TLS handshake is an example of second data.

At step S155, with the common key CB, the relay server 3 decrypts the encrypted data received from the first communication unit 20 of the secure box 4. The relay server 3 further encrypts the received data with the common key CA, and transmits the thus-encrypted data (i.e., the data including the information related to the second phase message) to the second communication unit 30 of the terminal apparatus 6.

At step S156, the second encryption unit 31 of the terminal apparatus 6 decrypts the received encrypted data with the common key CA. Further, the second verification unit 35 of the terminal apparatus 6 verifies a certificate of the server apparatus 12 included in the received data. The method of the verification is similar to the method described above in steps S201 and S202 of FIG. 7.

At step S157, in a procedure similar to that used in the process of step S150, the terminal apparatus 6 transmits the information to be used in the third phase message of the TLS handshake to the secure box 4 via the relay server 3. As described above in step S203 of FIG. 7, the third phase message includes ClientKeyExchange, ChangeCipherSpec, and Finished. The information that should be transmitted from the terminal apparatus 6 at step S157 is ClientKeyExchange related to the key exchange. ChangeCipherSpec and Finished may be set by the secure box 4, and thus may not be transmitted from the terminal apparatus 6.

The second generation unit 32 of the terminal apparatus 6 first generates a random number for creating the information of ClientKeyExchange related to the key exchange. In the case of the DH key exchange, the second generation unit 32 further generates the value A described above in step S212 of FIG. 8. In the case of the RSA key exchange, the second generation unit 32 uses the value of the generated random number as the common key, and generates the data of the common key encrypted with a public key of the server apparatus 12, as described above in step S230 of FIG. 9. With the common key CA, the second encryption unit 31 of the terminal apparatus 6 encrypts the data including the information related to the third phase message and the detection information described above in step S150. The second communication unit 30 of the terminal apparatus 6 transmits the encrypted data (i.e., the data including the information related to the third phase message of the TLS handshake) to the relay server 3.

At step S158, with the common key CA, the relay server 3 decrypts the encrypted data received from the terminal apparatus 6. The relay server 3 further encrypts the data with the common key CB and transmits the thus-encrypted data (i.e., the data including the information related to the third phase message) to the secure box 4.

At step S159, the first communication unit 20 of the secure box 4 receives from the relay server 3 the data encrypted with common key CB. The first encryption unit 21 of the secure box 4 then decrypts the received encrypted data with common key CB. Further, the detection unit 23 of the secure box 4 detects that the received data includes the detection information indicating that the received data includes the information related to the third phase message of the TLS handshake. The conversion unit 24 of the secure box 4 converts the received data into the third phase message of the TLS handshake. The first communication unit 20 of the secure box 4 transmits the converted data (i.e., the third phase message of the TLS handshake) to the third communication unit 40 of the server apparatus 12.

At step S160, with the received data, the third generation unit 42 of the server apparatus 12 generates a common key (hereinafter referred to as the common key C) to be used in the encrypted communication between the terminal apparatus 6 and the server apparatus 12. The above-described process of the DH key exchange (see FIG. 8) or the RSA key exchange (see FIG. 9) may be referred to for the method of generating the common key C. The third storage unit 43 of the server apparatus 12 stores the generated common key C. Herein, the common key C may be stored with information such as the session ID and the generation date and time, the reception date and time, the storage date and time, and the expiration date of the common key C.

At step S161, the third communication unit 40 of the server apparatus 12 transmits the fourth phase message of the TLS handshake to the first communication unit 20 of the secure box 4 in response to reception of the third phase message of the TLS handshake.

At step S162, the secure box 4 transmits the information related to the received fourth phase message of the TLS handshake to the terminal apparatus 6 via the relay server 3. Herein, the conversion unit 24 of the secure box 4 converts the fourth phase message into data to be transmitted to the terminal apparatus 6 such that the converted data includes the minimum necessary information in a particular format. The conversion unit 24 further includes the detection information described above in step S150 in the data to be transmitted. The first encryption unit 21 of the secure box 4 encrypts the data to be transmitted with the common key CB. The first communication unit 20 of the secure box 4 transmits the encrypted data (i.e., the data including the information related to the fourth phase message of the TLS handshake) to the relay server 3. Further, the setting unit 25 of the secure box 4 determines that the session has been established between the terminal apparatus 6 and the server apparatus 12. The setting unit 25, which manages the session status, then changes the session status from "unconnected" to "connected." This session status corresponds to the session status 58 included in the management information 54 illustrated in FIG. 6, for example. Alternatively, after the reception of the connection establishment notification transmitted from the second communication unit 30 of the terminal apparatus 6 or the management server 5 to notify that the session has been established, the setting unit 25 of the secure box 4 may change the session status from "unconnected" to "connected."

At step S163, with the common key CB, the relay server 3 decrypts the encrypted data received from the first communication unit 20 of the secure box 4. The relay server 3 further encrypts the received data with the common key CA, and transmits the thus-encrypted data (i.e., the data including the information related to the fourth phase message) to the second communication unit 30 of the terminal apparatus 6.

At step S164, the second encryption unit 31 of the terminal apparatus 6 decrypts the received encrypted data with the common key CA. Further, with the received data, the second generation unit 32 of the terminal apparatus 6 generates the common key to be used in the encrypted communication between the terminal apparatus 6 and the server apparatus 12 (i.e., the common key C). The above-described process of the DH key exchange (see FIG. 8) or the RSA key exchange (see FIG. 9) may be referred to for the method of generating the common key C. The second communication unit 30 of the terminal apparatus 6 may transmit a connection establishment notification message to the first communication unit 20 of the secure box 4 or the management server 5 to notify that the session has been established. The second storage unit 36 of the terminal apparatus 6 stores the generated common key C. Herein, the common key C may be stored with information such as the session ID and the generation date and time, the reception date and time, the storage date and time, and the expiration date of the common key C.

At step S165, the encrypted communication using the common key C is enabled between the terminal apparatus 6 and the server apparatus 12. The second encryption unit 31 of the terminal apparatus 6 encrypts the data to be transmitted to the relay server 3 by first encrypting the data with the common key C and then encrypting the thus-encrypted data with the common key CA. The second encryption unit 31 of the terminal apparatus 6 further decrypts the encrypted data received from the relay server 3 by first decrypting the data with the common key CA and then decrypting the thus-decrypted data with the common key C. The second updating unit 37 of the terminal apparatus 6 and the third updating unit 44 of the server apparatus 12 may update the common key C after the lapse of a particular time since the establishment of the session. Alternatively, the first updating unit 28 of the secure box 4 may request the second updating unit 37 of the terminal apparatus 6 and the third updating unit 44 of the server apparatus 12 to update the common key C after the lapse of a particular time since the establishment of the session.

With the above-described process, the information processing system 1 enables end-to-end encrypted communication between the terminal apparatus 6 and the server apparatus 12. According to a typical technique, a secure box located between a terminal apparatus and a server apparatus terminates a communication protocol such as TLS, preventing the end-to-end encrypted communication between the terminal apparatus and the server apparatus. In the information processing system 1, on the other hand, the regular TLS handshake is executed between the secure box 4 and the server apparatus 12, and the information for the TLS handshake is exchanged between the terminal apparatus 6 and the secure box 4. Thereby, the common key, which is normally generated by the secure box 4, is generated by the terminal apparatus 6 to be used in the encrypted communication. Although the information of the TLS handshake is routed through the relay server 3 in an unencrypted state, the relay server 3 is incapable of generating the common key. This is because the information as a basis for the key exchange (e.g., the random number value in the DH key exchange or the pre-encryption common key in the RSA key exchange) is not transmitted to the outside of the terminal apparatus 6.

A method of processing the received data in the secure box 4 will be described.

Figure 11:
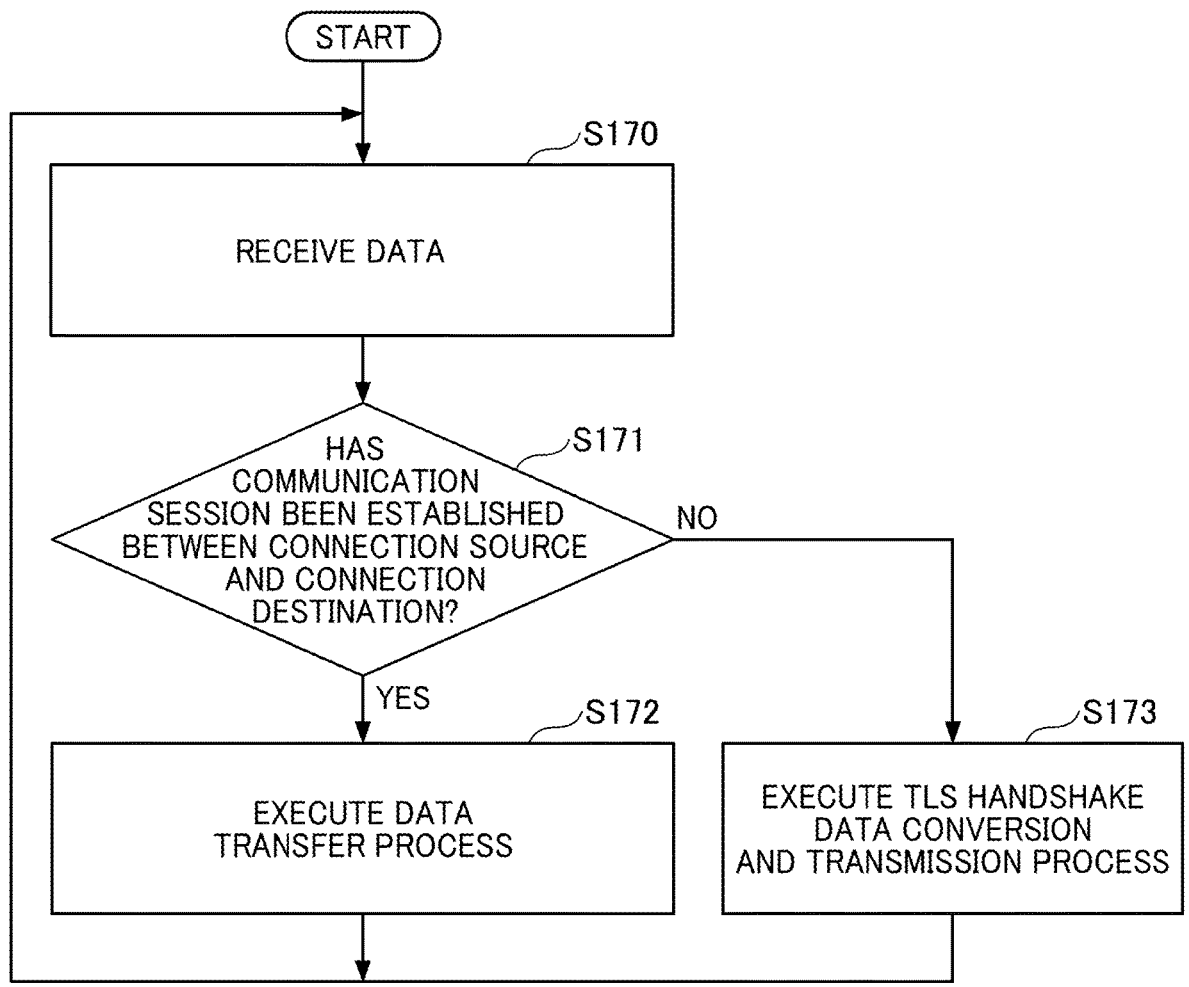
FIG. 11 is a flowchart illustrating an example of data processing performed in a secure box included in the information processing system of the first embodiment.

FIG. 11 is a flowchart illustrating an example of data processing performed in the secure box 4 of the present embodiment.

The processes of respective steps of the data processing in FIG. 11 will be described.

At step S170, the first communication unit 20 of the secure box 4 receives data from the relay server 3 or the third communication unit 40 of the server apparatus 12. If the first communication unit 20 of the secure box 4 receives data from the relay server 3, the first encryption unit 21 of the secure box 4 decrypts the received data.

At step S171, the detection unit 23 of the secure box 4 detects whether the session for the received data has been established between the terminal apparatus 6 (i.e., the connection source apparatus) and the server apparatus 12 (i.e., the connection destination apparatus) by checking the session status therebetween. The session status is assumed to be managed by the secure box 4 as the secure status 58 included in the management information 54 illustrated in FIG. 6, for example. Alternatively, the detection unit 23 of the secure box 4 may detect the session status by checking the detection information included in the received data described above in step S150 of FIG. 10. That is, if the received data is related to the TLS handshake, the detection unit 23 detects that the session has not been established (i.e., "unconnected"). If the received data is unrelated to the TLS handshake, the detection unit 23 detects that the session has been established. If the session has been established (YES at step S171), the data processing proceeds to step S172. If the session has not been established (NO at step S171), the data processing proceeds to step S173.

At step S172, if the data is received from the relay server 3, the first encryption unit 21 of the secure box 4 decrypts the received encrypted data with the common key CB. Further, the first communication unit 20 of the secure box 4 transmits the decrypted data to the third communication unit 40 of the server apparatus 12.

If the data is received from the third communication unit 40 of the server apparatus 12, the first encryption unit 21 of the secure box 4 encrypts the received data with the common key CB. Further, the first communication unit 20 of the secure box 4 transmits the encrypted data to the relay server 3.

At step S173, if the data is received from the relay server 3, the first encryption unit 21 of the secure box 4 first decrypts the received encrypted data with the common key CB. Then, the conversion unit 24 of the secure box 4 converts the data related to the TLS handshake included in the decrypted data into a message of the TLS handshake. The first communication unit 20 of the secure box 4 then transmits the converted message to the third communication unit 40 of the server apparatus 12.

If the data is received from the third communication unit 40 of the server apparatus 12, the conversion unit 24 of the secure box 4 first converts the message of the TLS handshake received from the third communication unit 40 of the server apparatus 12 into data related to the TLS handshake to be used by the terminal apparatus 6. Then, the first encryption unit 21 of the secure box 4 encrypts the converted data with the common key CB. The first communication unit 20 of the secure box 4 then transmits the encrypted data to the relay server 3.

With the above-described process, the detection unit 23 of the secure box 4 detects whether the session has been established between the terminal apparatus 6 and the server apparatus 12. Before the establishment of the session, the conversion unit 24 of the secure box 4 converts the data received from the connection source apparatus into the message conforming to the communication protocol used in the establishment of the session (i.e., the TLS protocol). The conversion unit 24 of the secure box 4 further converts the message conforming to the communication protocol and received from the connection destination apparatus into the data including at least the information for generating the common key. After the establishment of the session, the conversion unit 24 of the secure box 4 transmits the data received from the connection source apparatus to the connection destination apparatus in an unconverted state. The conversion unit 24 of the secure box 4 further transmits the data received from the connection destination apparatus to the connection source apparatus in an unconverted state. Herein, the data in an unconverted state refers to the data of the application or service handled between the connection source apparatus and the connection destination apparatus. Thus, data conversion by the encryption process in the communication with an intermediate apparatus (e.g., the relay server 3) is not taken into account here. The data of the application or service is an example of service data.

A second embodiment of the present invention will be described. The following description of the second embodiment will focus on differences from the first embodiment.

In the second embodiment, the terminal apparatus 6 and the secure box 4 previously exchange the information for use in the TLS handshake, and then the TLS handshake is executed between the secure box 4 and the server apparatus 12.

Figure 12:
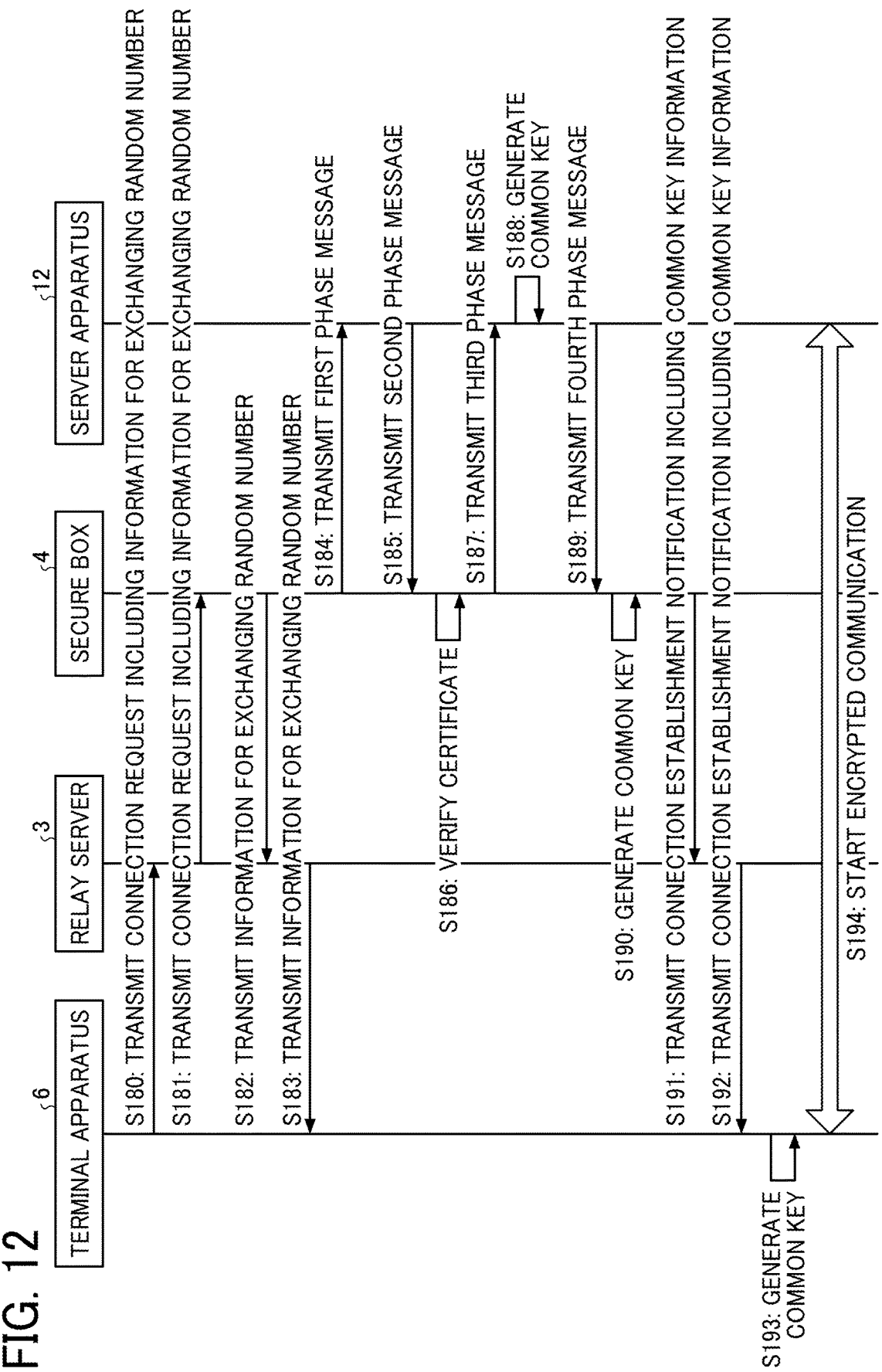
FIG. 12 is a diagram illustrating a sequence example of a session connection process according to a second embodiment of the present invention.

FIG. 12 is a diagram illustrating a sequence example of a session connection process of the second embodiment. Similarly as in the first embodiment, data is transmitted and received between the terminal apparatus 6 and the relay server 3 through the encrypted communication with the common key CA and between the relay server 3 and the secure box 4 through the encrypted communication with the common key CB. Description of the processes following this data transmission and reception will be omitted here.

The processes of respective steps of the session connection process in FIG. 12 will be described below.

At step S180, the second communication unit 30 of the terminal apparatus 6 transmits a connection request message to the relay server 3 to request the connection to the connection destination (i.e., the server apparatus 12). The connection request message includes the information for exchanging between the terminal apparatus 6 and the secure box 4 the value of the random number used in the key exchange in the TLS handshake by the secure box 4. As a method of the key exchange, the DH key exchange described above with FIG. 8 is used. That is, the terminal apparatus 6 and the secure box 4 correspond to the client 14 and the server 15 in FIG. 8, respectively, and the value of the common key shared by the terminal apparatus 6 and the secure box 4 is set as the random number used in the key exchange in the TLS handshake by the secure box 4. In FIG. 8, the server 15 first transmits the value B to the client 14. Which of the client 14 and the server 15 transmits the data first is, however, irrelevant here. It is assumed in the present example that the client 14 first transmits the value A to the server 15. The second communication unit 30 of the terminal apparatus 6 therefore transmits the value corresponding to the value A in FIG. 8 to the relay server 3.

At step S181, the relay server 3 transfers the received data of the connection request message to the secure box 4. Description of the encryption process in this transfer will be omitted here, as described above.

At step S182, the first communication unit 20 of the secure box 4 transmits the value corresponding to the value B in FIG. 8 to the relay server 3.

At step S183, the relay server 3 transfers the received data of the value to the terminal apparatus 6.

At step S184, the first communication unit 20 of the secure box 4 transmits the first phase message of the TLS handshake to the third communication unit 40 of the server apparatus 12. The contents of the first phase message transmitted here are as described above in step S200 of FIG. 7.

At step S185, the third communication unit 40 of the server apparatus 12 transmits the second phase message of the TLS handshake to the first communication unit 20 of the secure box 4. The contents of the second phase message transmitted here are as described above in step S201 of FIG. 7.

At step S186, the first verification unit 26 of the secure box 4 verifies a certificate of the server apparatus 12 included in the received data. The method of the verification is similar to that described above in steps S201 and S202 of FIG. 7.

At step S187, the first communication unit 20 of the secure box 4 transmits the third phase message of the TLS handshake to the third communication unit 40 of the server apparatus 12. The contents of the third phase message transmitted here are as described above in step S203 of FIG. 7.

At step S188, with the received data of the third phase message, the third generation unit 42 of the server apparatus 12 generates the common key to be used in the encrypted communication between the terminal apparatus 6 and the server apparatus 12 (i.e., the common key C). The above-described process of the DH key exchange (see FIG. 8) or the RSA key exchange (see FIG. 9) may be referred to for the method of generating the common key C.

At step S189, the third communication unit 40 of the server apparatus 12 transmits the fourth phase message of the TLS handshake to the first communication unit 20 of the secure box 4. The contents of the fourth phase message transmitted here are as described above in step S205 of FIG. 7.

At step S190, with the received data of the fourth phase message, the first generation unit 22 of the secure box 4 generates the common key to be used in the encrypted communication between the terminal apparatus 6 and the server apparatus 12 (i.e., the common key C). The above-described process of the DH key exchange (see FIG. 8) or the RSA key exchange (see FIG. 9) may be referred to for the method of generating the common key C. The common key C is generated and used in the terminal apparatus 6, and is not necessarily required to be generated by the secure box 4.

At step S191, the first communication unit 20 of the secure box 4 transmits a connection establishment notification message to the relay server 3. The connection establishment notification message includes the information related to the key exchange method used in the TLS handshake. If the DH key exchange is used in the TLS handshake, the value corresponding to the value B in FIG. 8 is further included in the connection establishment notification message. If the RSA key exchange is used in the TLS handshake, the value of the common key C has already been shared between the terminal apparatus 6 and the secure box 4 at steps S180 to S183, and thus does not need to be transmitted here.

At step S192, the relay server 3 transfers the received data of the connection establishment notification message to the terminal apparatus 6.

At step S193, if the DH key exchange is used in the TLS handshake, the second generation unit 32 of the terminal apparatus 6 generates the common key (i.e., the common key C) with the received data of the connection establishment notification message. The above-described process of the DH key exchange (see FIG. 8) may be referred to for the method of generating the common key C.

At step S194, the encrypted communication using the common key C is enabled between the terminal apparatus 6 and the server apparatus 12.

With the above-described process, the encrypted communication using the common key C is enabled between the terminal apparatus 6 and the server apparatus 12 similarly as in the first embodiment. Further, the relay server 3 is incapable of acquiring the common key C, and thus is unable to decrypt the encrypted communication. In the second embodiment, the secure box 4 is capable of acquiring the common key C, unlike in the first embodiment. However, since the secure box 4 is an apparatus located in the local network 10, the secure box 4 holding the common key C is not considered a problem.

A third embodiment of the present invention will be described. The following description of the third embodiment will focus on differences from the first and second embodiments.

It is assumed in the third embodiment that setting information for use in the TLS handshake (e.g., the encryption method) is previously shared between the terminal apparatus 6 and the secure box 4. The TLS handshake between the secure box 4 and the server apparatus 12 starts in response to a connection request from the terminal apparatus 6. After the completion of the TLS handshake, the secure box 4 transmits the common key to the terminal apparatus 6 in a secure fashion that prevents information leakage to a third party.

Figure 13:
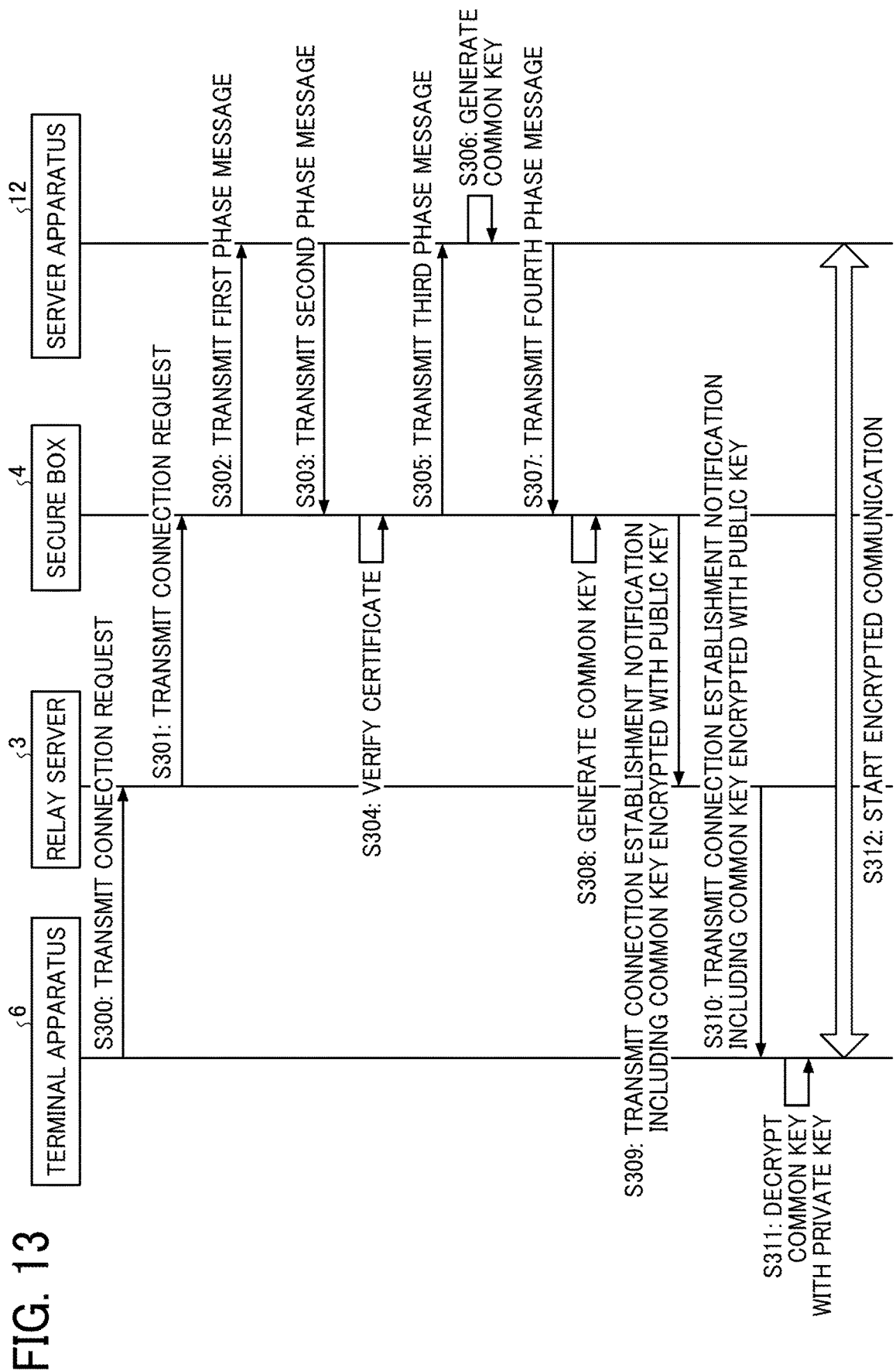
FIG. 13 is a diagram illustrating a sequence example of a session connection process according to a third embodiment of the present invention.

FIG. 13 is a diagram illustrating a sequence example of a session connection process of the third embodiment.

The processes of respective steps of the session connection process in FIG. 13 will be described below.

At step S300, the second communication unit 30 of the terminal apparatus 6 transmits a connection request message to the relay server 3 to request the connection to the connection destination (i.e., the server apparatus 12).

At step S301, the relay server 3 transfers the received data of the connection request message to the secure box 4.

The processes of steps S302 to S308 are similar to those of steps S184 to S190 of the second embodiment illustrated in FIG. 12, and thus description thereof will be omitted here. In the third embodiment, however, the first generation unit 22 of the secure box 4 generates the random number value or the common key to be used in the key exchange in the TLS handshake.

At step S309, with a public key of the terminal apparatus 6, the first encryption unit 21 of the secure box 4 encrypts the common key C acquired through the TLS handshake to be used in the encrypted communication between the terminal apparatus 6 and the sever apparatus 12. It is assumed here that the public key of the terminal apparatus 6 is deployed in the secure box 4. The first communication unit 20 of the secure box 4 transmits a connection establishment notification message to the relay server 3. The connection establishment notification message includes the common key C encrypted with the public key of the terminal apparatus 6.

At step S310, the relay server 3 transfers the received data of the connection establishment notification message to the terminal apparatus 6.

At step S311, the second encryption unit 31 of the terminal apparatus 6 decrypts the received encrypted common key C with a private key of the terminal apparatus 6.

At step S312, the encrypted communication using the common key C is enabled between the terminal apparatus 6 and the server apparatus 12.

With the above-described process, the encrypted communication using the common key C is enabled between the terminal apparatus 6 and the server apparatus 12 similarly as in the first and second embodiments. Further, the relay server 3 is incapable of acquiring the common key C, and thus is unable to decrypt the encrypted communication. In the third embodiment, the secure box 4 is capable of acquiring the common key C similarly as in the second embodiment.

A description will be given of a first modified example, which is a modified example of the first embodiment. The following description of the first modified example will focus on differences from the first embodiment.

It is assumed here that, in the execution of the process of step S113 in FIG. 4, the common key used in the communication between the terminal apparatus 6 and the server apparatus 12 is stored in the second storage unit 36 of the terminal apparatus 6. In this case, the second communication unit 30 of the terminal apparatus 6 transmits a message to the relay server 3 to request to establish a session for encrypted communication using the stored common key. The message may include information such as the information for identifying the common key (e.g., the session ID) and the generation date and time, the reception date and time, the storage date and time, and the expiration date of the common key.

The relay server 3 transmits the received message to the first communication unit 20 of the secure box 4.

The first communication unit 20 of the secure box 4 transmits the received message to the third communication unit 40 of the server apparatus 12.

With the above-described process, the encrypted communication between the terminal apparatus 6 and the server apparatus 12 is enabled.

If the common key is not stored in the third storage unit 43 of the server apparatus 12, or if a certain determination is made based on information such as the generation date and time, the reception date and time, the storage date and time, and the expiration date of the common key, the secure box 4 or the server apparatus 12 may reject the request from the terminal apparatus 6. In this case, the secure box 4 or the server apparatus 12 may transmit a message to the terminal apparatus 6 to request to establish a session for encrypted communication using a new common key.

A description will be given of a second modified example, which is a modified example of the second embodiment. The following description of the second modified example will focus on differences from the second embodiment.

The TLS handshake is first executed between the terminal apparatus 6 and the secure box 4 to establish a session, allowing the encrypted communication therebetween. Thereby, information is transmitted and received between the terminal apparatus 6 and the secure box 4 without information leakage to a third party at the relay server 3, for example. Then, the random number value shared in the processes of steps S180 to S183 in FIG. 12 is transmitted to the secure box 4 from the terminal apparatus 6 through the above-described encrypted communication.

A description will be given of a third modified example, which is a modified example of the third embodiment. The following description of the third modified example will focus on differences from the third embodiment.

Similarly as in the second modified example, the TLS handshake is first executed between the terminal apparatus 6 and the secure box 4 to establish a session, allowing the encrypted communication therebetween. Then, the common key C transmitted in the processes of steps S309 and S310 in FIG. 13 is transmitted through the encrypted communication.

As described above, the embodiments of the present invention enable the encrypted communication across the information processing apparatus terminating the communication protocol for encryption, such as a relay server or a firewall.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

For example, the functional blocks in the configuration example of FIG. 3 are divided in accordance with major functions of the information processing system 1 and the information processing apparatus forming each of the secure box 4, the terminal apparatus 6, and the server apparatus 12 to facilitate the understanding of the processes performed by the information processing system 1 and the information processing apparatus. The disclosure of the present application should not be limited by how the processing units are divided or by the names of the processing units. The processes of the information processing system 1 and the information processing apparatus may be divided into a larger number of processing units in accordance with the processes. Further, each of the processing units may be divided to include a plurality of processes.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

Further, the above-described steps are not limited to the order disclosed herein. The apparatuses described above form one of a plurality of computing environments for implementing the embodiments disclosed in the present specification. In an embodiment of the present invention, each of the information processing system 1 and the information processing apparatus is a server cluster including a plurality of computing devices configured to communicate with each other via a desired type of communication link such as a network or a shared memory, for example, to execute the processes disclosed in the present specification.

Further, each of the first communication unit 20, the second communication unit 30, and the third communication unit 40 may be simply referred to as the communication unit. The order of first, second, and third may be changed if the first communication unit 20, the second communication unit 30, and the third communication unit 40 are distinguishable from each other. The same applies to other units such as the first encryption unit 21, the second encryption unit 31, and the third encryption unit 41, the first generation unit 22, the second generation unit 32, and the third generation unit 42, and the first verification unit 26 and the second verification unit 35.

According to the first embodiment, an information processing apparatus communicates with a connection source apparatus that uses a service and a connection destination apparatus that provides the service. The information processing apparatus includes a detection unit, a generation unit, and a communication unit.

The detection unit detects the reception of first data from the connection source apparatus. The first data includes information related to the establishment of a session for executing encrypted communication between the connection source apparatus and the connection destination apparatus. With a random number value included in the first data, the generation unit generates information for exchanging a common key used in the encrypted communication. The communication unit transmits a first message to the connection destination apparatus. The first message includes the information for exchanging the common key, and conforms to a communication protocol used in the establishment of the session. The communication unit further receives a second message from the connection destination apparatus as a reply to the first message, and transmits information for generating the common key to the connection source apparatus. The information for generating the common key is included in the second message. After the establishment of the session, the communication unit transmits first service data from the connection source apparatus to the connection destination apparatus in an unconverted state, and transmits second service data from the connection destination apparatus to the connection source apparatus in an unconverted state. The first service data and the second service data are used in the service.

According to the first embodiment, an information processing apparatus communicates with a connection source apparatus that uses a service and a connection destination apparatus that provides the service. The information processing apparatus includes a detection unit, a generation unit, an encryption unit, and a communication unit.

The detection unit detects the reception from the connection source apparatus of a request message requesting to establish a session for executing encrypted communication between the connection source apparatus and the connection destination apparatus. The generation unit generates information for exchanging a common key used in the encrypted communication. The encryption unit encrypts the common key to be transmitted to the connection source apparatus. The communication unit transmits a first message to the connection destination apparatus. The first message includes the information for exchanging the common key, and conforms to a communication protocol used in the establishment of the session. The communication unit further receives a second message from the connection destination apparatus as a reply to the first message, and transmits the common key to the connection source apparatus. The common key is generated and encrypted with the second message. After the establishment of the session, the communication unit transmits first service data from the connection source apparatus to the connection destination apparatus in an unconverted state, and transmits second service data from the connection destination apparatus to the connection source apparatus in an unconverted state. The first service data and the second service data are used in the service.

According to the first embodiment, an information processing method is executed by an information processing apparatus that communicates with a connection source apparatus that uses a service and a connection destination apparatus that provides the service. The information processing method includes detecting the reception of first data from the connection source apparatus. The first data includes information related to the establishment of a session for executing encrypted communication between the connection source apparatus and the connection destination apparatus. The information processing method further includes converting the first data into a first message conforming to a communication protocol used in the establishment of the session, and converting a second message received from the connection destination apparatus as a reply to the first message into second data including at least information for generating a common key that is used in the encrypted communication. The information processing method further includes, before the establishment of the session, transmitting the first message to the connection destination apparatus and transmitting the second data to the connection source apparatus, and after the establishment of the session, transmitting first service data from the connection source apparatus to the connection destination apparatus in an unconverted state and transmitting second service data from the connection destination apparatus to the connection source apparatus in an unconverted state. The first service data and the second service data are used in the service.

The invention claimed is:

1. An information processing apparatus comprising circuitry configured to
set management information to manage status of a session,
detect, using the management information, reception of first data from a connection source apparatus, the first data including information related to establishment of the session for executing encrypted communication between the connection source apparatus using a service and a connection destination apparatus providing the service,
convert the first data into a first message conforming to a communication protocol used in the establishment of the session, and convert a second message received from the connection destination apparatus as a reply to the first message into second data including at least information for generating a common key used in the encrypted communication,
before the establishment of the session, set the management information to indicate that the session is unconnected, transmit the first message to the connection destination apparatus, and transmit the second data to the connection source apparatus, and
after the establishment of the session, set the management information to indicate that the session is connected, transmit first service data from the connection source apparatus to the connection destination apparatus in an unconverted state, and transmit second service data from the connection destination apparatus to the connection source apparatus in an unconverted state, the first service data and the second service data being used in the service.

2. The information processing apparatus of claim 1, wherein the circuitry detects the reception of the first data from the connection source apparatus using data type information included in data received from the connection source apparatus, the data type information indicating type of the data.

3. The information processing apparatus of claim 1, wherein the circuitry requests the connection source apparatus and the connection destination apparatus to update the common key after lapse of a particular time since the establishment of the session.

4. The information processing apparatus of claim 1, wherein the circuitry transmits an application of a world wide web browser to the connection source apparatus to allow the connection source apparatus to perform a process for establishing the session with the application.

5. An information processing system comprising:
a connection source apparatus configured to use a service;
a connection destination apparatus configured to provide the service; and
an information processing apparatus including first circuitry configured to
set management information to manage status of a session,
detect, using the management information, reception of first data from the connection source apparatus, the first data including information related to establishment of the session for executing encrypted communication between the connection source apparatus and the connection destination apparatus,
convert the first data into a first message conforming to a communication protocol used in the establishment of the session, and convert a second message received from the connection destination apparatus as a reply to the first message into second data including at least information for generating a common key used in the encrypted communication,
before the establishment of the session, set the management information to indicate that the session is unconnected, transmit the first message to the connection destination apparatus, and transmit the second data to the connection source apparatus, and
after the establishment of the session, set the management information to indicate that the session is connected, transmit first service data from the connection source apparatus to the connection destination apparatus in an unconverted state, and transmit second service data from the connection destination apparatus to the connection source apparatus in an unconverted state, the first service data and the second service data being used in the service,
the connection source apparatus including second circuitry configured to
transmit the first data to the information processing apparatus and receive the second data from the information processing apparatus,
generate the common key with the second data, and
after the establishment of the session, use the common key to encrypt the first service data used in the service and decrypt the second service data used in the service, and
the connection destination apparatus including third circuitry configured to
receive the first message from the information processing apparatus and transmit the second message to the information processing apparatus,
generate the common key with the first message, and
after the establishment of the session, use the common key to encrypt the second service data used in the service and decrypt the first service data used in the service.

6. The information processing system of claim 5, wherein the first circuitry detects the reception of the first data from the connection source apparatus using data type information included in data received from the connection source apparatus, the data type information indicating type of the data.

7. The information processing system of claim 5, wherein the first circuitry requests the connection source apparatus and the connection destination apparatus to update the common key after lapse of a particular time since the establishment of the session.

8. The information processing system of claim 5, wherein the first circuitry transmits an application of a world wide web browser to the connection source apparatus to allow the connection source apparatus to perform a process for establishing the session with the application.

9. A non-transitory recording medium which, when executed by one or more processors, cause the processors to perform a method comprising:
- setting management information to manage status of a session,
- detecting, using the management information, reception of first data from a connection source apparatus, the first data including information related to establishment of the session for executing encrypted communication between the connection source apparatus using a service and a connection destination apparatus providing the service;
- converting the first data into a first message conforming to a communication protocol used in the establishment of the session, and converting a second message received from the connection destination apparatus as a reply to the first message into second data including at least information for generating a common key used in the encrypted communication;
- before the establishment of the session, setting the management information to indicate that the session is unconnected, transmitting the first message to the connection destination apparatus, and transmitting the second data to the connection source apparatus; and
- after the establishment of the session, setting the management information to indicate that the session is connected, transmitting first service data from the connection source apparatus to the connection destination apparatus in an unconverted state, and transmitting second service data from the connection destination apparatus to the connection source apparatus in an unconverted state, the first service data and the second service data being used in the service.

10. The non-transitory recording medium of claim 9, the method further comprising detecting the reception of the first data from the connection source apparatus using data type information included in data received from the connection source apparatus, the data type information indicating type of the data.

11. The non-transitory recording, medium of claim 9, the method further comprising requesting the connection source apparatus and the connection destination apparatus to update the common key after lapse of a particular time since the establishment of the session.

12. The non-transitory recording medium of claim 9, the method further comprising transmitting an application of a world wide web browser to the connection source apparatus to allow the connection source apparatus to perform a process for establishing the session with the application.

\* \* \* \* \*